(12) United States Patent
Izumi et al.

(10) Patent No.: US 8,606,400 B2
(45) Date of Patent: Dec. 10, 2013

(54) ROBOT SYSTEM

(75) Inventors: Tetsuro Izumi, Kitakyushu (JP);
Kenichi Koyanagi, Kitakyushu (JP);
Kenji Matsukuma, Kitakyushu (JP);
Yukio Hashiguchi, Kitakyushu (JP)

(73) Assignee: Kabushiki Kaisha Yaskawa Denki, Kitakyushu-Shi (JP)

( * ) Notice: Subject to any disclaimer, the term of this patent is extended or adjusted under 35 U.S.C. 154(b) by 0 days.

(21) Appl. No.: 13/354,723

(22) Filed: Jan. 20, 2012

(65) Prior Publication Data

US 2012/0323363 A1    Dec. 20, 2012

(30) Foreign Application Priority Data

Jun. 20, 2011 (JP) .................... 2011-136651
Jun. 20, 2011 (JP) .................... 2011-136652
Jun. 20, 2011 (JP) .................... 2011-136653

(51) Int. Cl.
*G05B 19/418*    (2006.01)

(52) U.S. Cl.
USPC ............ 700/248; 700/247; 700/259; 414/217

(58) Field of Classification Search
USPC .................... 700/245–261; 209/629; 364/47
See application file for complete search history.

(56) References Cited

U.S. PATENT DOCUMENTS

| | | | |
|---|---|---|---|
| 4,580,207 A | | 4/1986 | Arai et al. |
| 6,360,142 B1 * | | 3/2002 | Miura et al. .................. 700/245 |
| 6,364,195 B1 * | | 4/2002 | Masuda et al. .................. 228/37 |
| 7,654,380 B2 * | | 2/2010 | Nishihara et al. ............. 198/349 |
| 7,720,573 B2 * | | 5/2010 | Yamada et al. ............... 700/245 |
| 2005/0075752 A1 * | | 4/2005 | Ban et al. ...................... 700/213 |
| 2005/0166413 A1 * | | 8/2005 | Crampton ....................... 33/503 |
| 2007/0108109 A1 | | 5/2007 | Erlandsson-Warvelin et al. |
| 2007/0179671 A1 * | | 8/2007 | Arimatsu et al. ............. 700/247 |

FOREIGN PATENT DOCUMENTS

| | | |
|---|---|---|
| EP | 1092512 | 4/2001 |
| EP | 1522911 | 4/2005 |
| EP | 1748339 | 1/2007 |
| JP | 06-340321 | 12/1994 |
| JP | 08-336783 | 12/1996 |
| JP | 10-138181 | 5/1998 |
| JP | 2002-37441 | 2/2002 |
| JP | 2002-234615 | 8/2002 |
| JP | 2002-283257 | 10/2002 |
| JP | 2002-316716 | 10/2002 |
| JP | 2007-015055 | 1/2007 |
| JP | 2007-030087 | 2/2007 |
| JP | 2009-291895 | 12/2009 |

OTHER PUBLICATIONS

Extended European Search Report for corresponding EP Application No. 12151926.8-1239, May 4, 2012.

(Continued)

*Primary Examiner* — Khoi Tran
*Assistant Examiner* — Rachid Bendidi
(74) *Attorney, Agent, or Firm* — Ditthavong Mori & Steiner, P.C.

(57) ABSTRACT

A robot system according to embodiments includes a conveying device, a plurality of robots, an image capturing device, a workpiece detecting device, and a control device. The control device includes an operation instruction unit and an allocating unit. The operation instruction unit generates an operation instruction for performing a holding operation on workpieces on the basis of the detection result of the workpiece detecting device and transmits the operation instruction to the robots. The allocating unit determines which of the plurality of robots to which the operation instruction unit transmits the operation instruction on the basis of conveying situations of the workpieces obtained from the detection result of the workpiece detecting device.

17 Claims, 20 Drawing Sheets

(56) References Cited

OTHER PUBLICATIONS

Japanese Office Action for corresponding JP Application No. 2011-136651, Jul. 16, 2013.
Japanese Office Action for corresponding JP Application No. 2011-136653, Jul. 16, 2013.
Extended European Search Report for corresponding EP Application No. 13000329.6-1807, Mar. 6, 2013.
Extended European Search Report for corresponding EP Application No. 13000330.4-1807, Mar. 6, 2013.
Japanese Office Action for corresponding JP Application No. 2011-136652, Aug. 6, 2013.

* cited by examiner

|  | NUMBER OF PROCESSED WORKPIECES |
|---|---|
| ROBOT 2a | 100 |
| ROBOT 2b | 50 |

CONVEYANCE DIRECTION

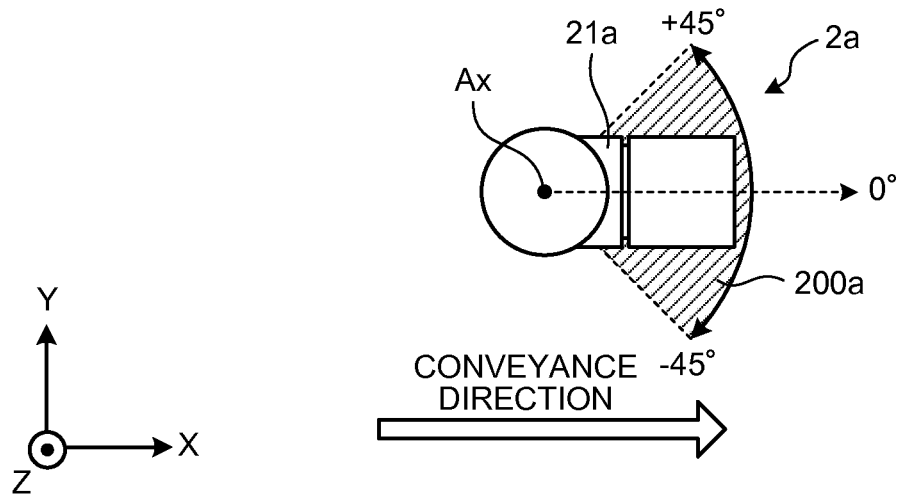
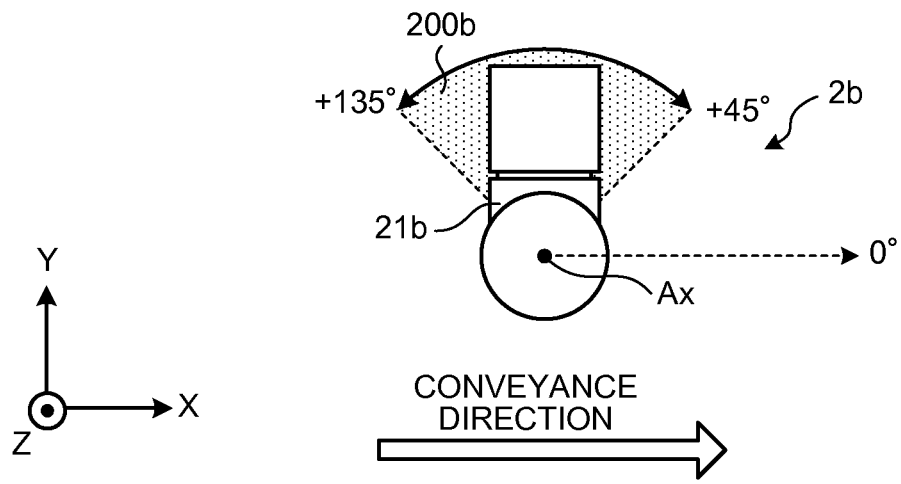

|  | NUMBER OF PROCESSED WORKPIECES |
|---|---|
| ROBOT 2a | 100 |
| ROBOT 2b | 50 |

CONVEYANCE DIRECTION

CONVEYANCE DIRECTION

CONVEYANCE DIRECTION

CONVEYANCE DIRECTION

|  | NUMBER OF PROCESSED WORKPIECES |
|---|---|
| ROBOT 2a | 100 |
| ROBOT 2b | 50 |

|  | PAIRED CAMERAS |
|---|---|
| ROBOT 2a | CAMERA 3a |
| ROBOT 2b | CAMERA 3b |

|  | PAIRED CAMERAS |
|---|---|
| ROBOT 2a | CAMERA 3b |
| ROBOT 2b | CAMERA 3a |

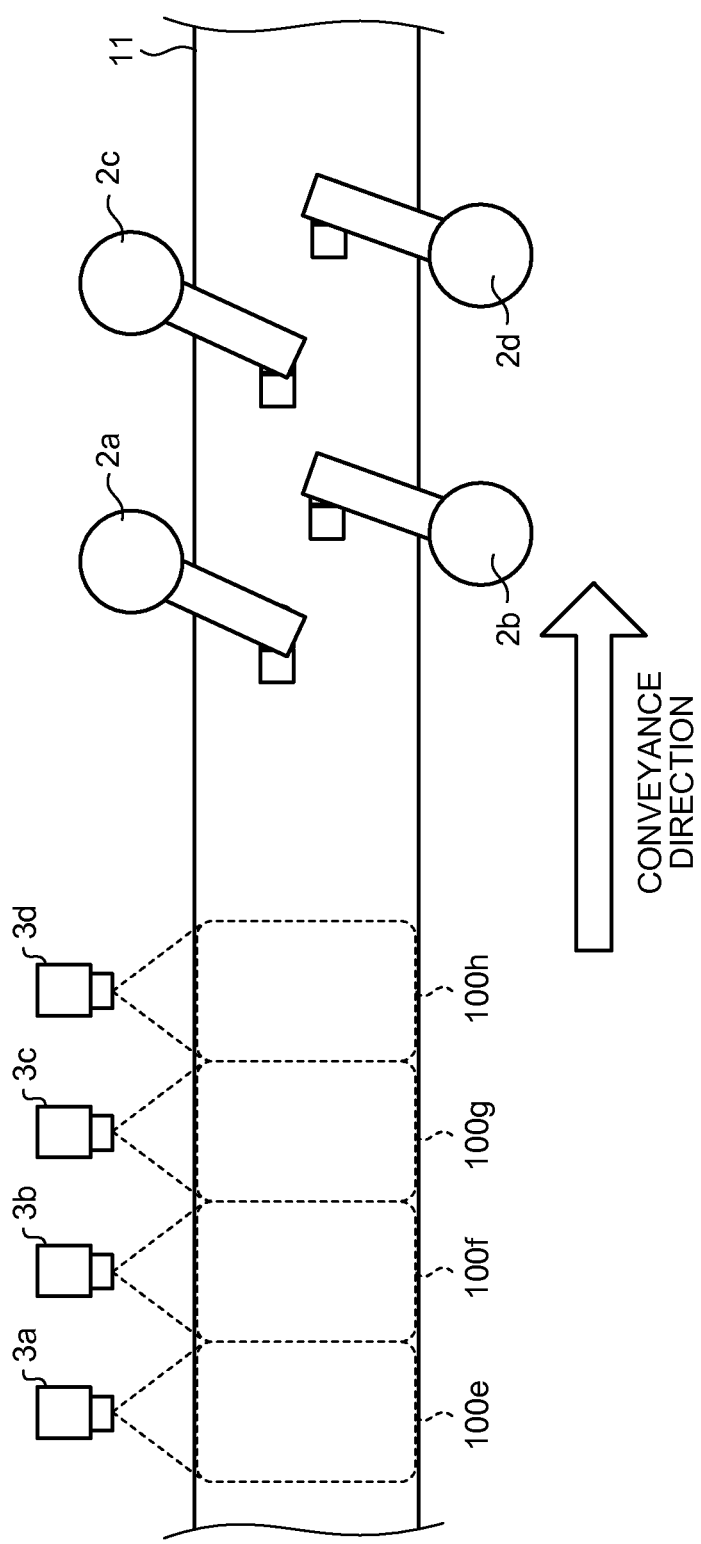

ROBOT SYSTEM

CROSS-REFERENCE TO RELATED APPLICATIONS

This application is based upon and claims the benefit of priority of the prior Japanese Patent Application No. 2011-136651, filed on Jun. 20, 2011; Japanese Patent Application No. 2011-136652, filed on Jun. 20, 2011; Japanese Patent Application No. 2011-136653, filed on Jun. 20, 2011; the entire contents of all of which are incorporated herein by reference.

FIELD

The embodiments discussed herein are directed to a robot system

BACKGROUND

There has been known a picking system that holds a workpiece conveyed by a conveying device such as a belt conveyor by using a robot and moves the held workpiece to another place.

The picking system requires speed-up of a conveyance speed in order to achieve improvement of work efficiency. For this reason, a picking system that performs a holding operation on workpieces by using a plurality of robots is developed in order to correspond to the speed-up of the conveyance speed. The picking system has been known as disclosed in, Japanese Laid-open Patent Publication No. H6-340321.

Although the picking system can correspond to speed-up of a conveyance speed by using the plurality of robots as described above, it is preferable to achieve further improvement of work efficiency.

SUMMARY

A robot system according to an aspect of embodiments includes a conveying device, a plurality of robots, an image capturing device, a workpiece detecting device, and a control device. The conveying device conveys workpieces. The robots perform a working operation on the workpieces conveyed by the conveying device. The image capturing device is placed at the upper stream side of the conveying device than the plurality of robots to capture a conveying path of the conveying device. The workpiece detecting device detects the workpieces on the conveying path on the basis of an image captured by the image capturing device. The control device controls operations of the plurality of robots. Moreover, the control device includes an operation instruction unit and an allocating unit. The operation instruction unit generates an operation instruction for performing a holding operation on the workpieces on the basis of the detection result of the workpiece detecting device and transmits the operation instruction to the robots. The allocating unit determines which of the plurality of robots to which the operation instruction unit transmits the operation instruction on the basis of conveying situations of the workpieces obtained from the detection result of the workpiece detecting device.

BRIEF DESCRIPTION OF DRAWINGS

A more complete appreciation of the invention and many of the attendant advantages thereof will be readily obtained as the same becomes better understood by reference to the following detailed description when considered in connection with the accompanying drawings, wherein:

FIG. 11A is a diagram illustrating an example of an initial posture of one robot;

FIG. 11B is a diagram illustrating an example of an initial posture of the other robot;

FIG. 21 is a diagram illustrating another example of the robot system; and

DESCRIPTION OF EMBODIMENTS

A robot system according to embodiments includes a conveying device, a plurality of robots, an image capturing device, a workpiece detecting device, and a control device.

The conveying device conveys workpieces. The robots perform working operations on the workpieces conveyed by the conveying device. The image capturing device is placed at the upper stream side of the conveying device than the plurality of robots to capture an image of the conveying path of the conveying device. The workpiece detecting device detects the workpieces on the conveying path on the basis of the image captured by the image capturing device. The control device controls the operations of the plurality of robots.

The control device includes an operation instruction unit and an allocating unit. The operation instruction unit generates an operation instruction for making a robot perform a holding operation on a workpiece on the basis of the detection result of the workpiece detecting device and transmits the operation instruction to the robot. The allocating unit determines a robot, to which the operation instruction unit transmits an operation instruction, among the plurality of robots on the basis of the conveying situation of each workpiece obtained from the detection result of the workpiece detecting device.

First Embodiment

First, the first embodiment will be explained.

Figure 1:
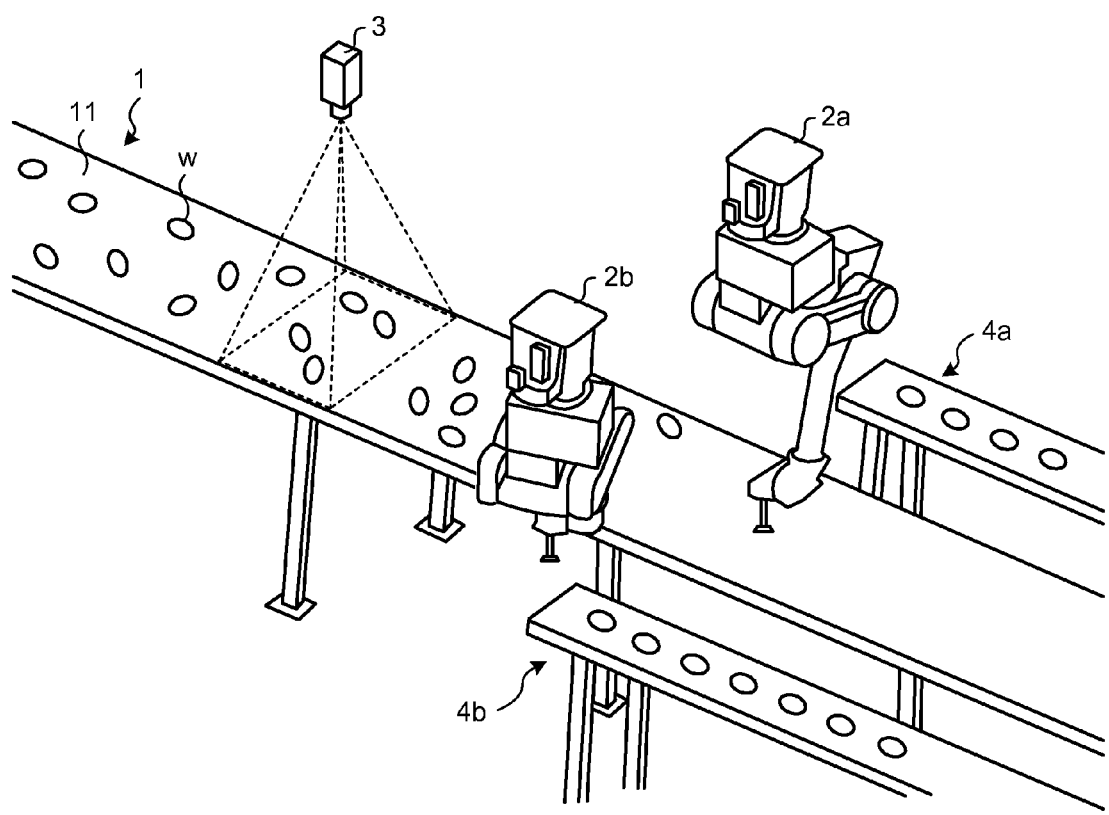
FIG. 1 is a pattern perspective view of a robot system according to a first embodiment.

FIG. 1 is a pattern perspective view of a robot system according to the first embodiment. Hereinafter, it will be explained that the robot system includes two robots as an example. Moreover, it will be explained in the present embodiment that adsorption units 22a and 22b that are an example of a holding device hold workpieces conveyed by a conveyer 1 that is an example of the conveying device and then place the held workpieces on a conveying path 11 as an example of a working operation.

As illustrated in FIG. 1, the robot system according to the first embodiment includes the conveyer 1, robots 2a and 2b, and a camera 3. The conveyer 1 is a conveying device that conveys workpieces w placed on the conveying path 11 from the upper stream side toward the lower stream side. Herein, it is assumed that the conveyer 1 is a belt conveyor as an example. However, the conveyer 1 may be any conveying device if it can convey the workpieces w in a predetermined direction.

The robots 2a and 2b are vertical articulated robots that are fixed on a ceiling, a wall surface, a floor, or the like to perform a holding operation for holding the workpieces w conveyed by the conveyer 1 and a moving operation for moving the held workpieces w to a predetermined place.

For example, each of the robots 2a and 2b includes, as an end effector, an adsorption unit that adsorbs the workpiece w by using a suction device such as a vacuum pump. Each of the robots 2a and 2b holds the workpiece w by using the adsorption unit. Moreover, the robots 2a and 2b respectively move the held workpieces w to the conveyers 4a and 4b and then place the held workpieces w on conveyers 4a and 4b by removing attractive forces generated by the suction devices.

Herein, it is assumed that the robots 2a and 2b include adsorption units as an end effector. However, the robots 2a and 2b may include other end effectors if they can hold the workpieces w. For example, the robots 2a and 2b may include hand-type end effectors that grip the workpieces w.

In the first embodiment, it is explained that the robots 2a and 2b employ a vertical articulated robot. However, the configuration of the robot is not limited to this. Therefore, the robots 2a and 2b may employ a horizontal articulated robot, a parallel link robot, an orthogonal robot, or the like, if they can hold and transfer the workpieces w.

Herein, it is explained that the robots 2a and 2b are faced while placing the conveying path 11 therebetween. However, the embodiment is not limited to this. Therefore, the robots 2a and 2b may be placed side by side along the conveying path 11 or may be provided on the upper side of the conveying path 11.

The camera 3 is an image capturing device that is placed at the upper stream side of the conveyer 1 than the robots 2a and 2b to capture an image of a predetermined area on the conveying path 11 of the conveyer 1. An image captured by the camera 3 is output to the control device via a communication network such as a local area network (LAN).

According to the robot system having the above configuration, the camera 3 captures the image of the conveying path 11, and the control device detects the workpieces w on the conveying path 11 on the basis of the image captured by the camera 3 and instructs the robots 2a and 2b to perform a holding operation on the detected workpieces w. Then, the robots 2a and 2b perform the holding operation and the moving operation in accordance with the instruction of the control device.

Herein, when it is necessary to process large quantity of workpieces in a short time, a robot system adjacently provides multiple robots and makes the downstream-side robot process workpieces that are not processed by the upstream-side robot to achieve improvement of processing performance. However, in such a method, a load concentrates on the robot placed at the upstream side and thus the robot system may not be efficient as a whole.

Therefore, the control device according to the first embodiment associates divided areas divided parallel to the conveyance direction of the workpieces w with the respective robots 2a and 2b and instructs the robots 2a and 2b corresponding to the respective divided areas to perform the holding operation on the workpieces w belonging to the respective divided areas. Hereinafter, the configuration and operation of the control device will be specifically explained.

Figure 2:
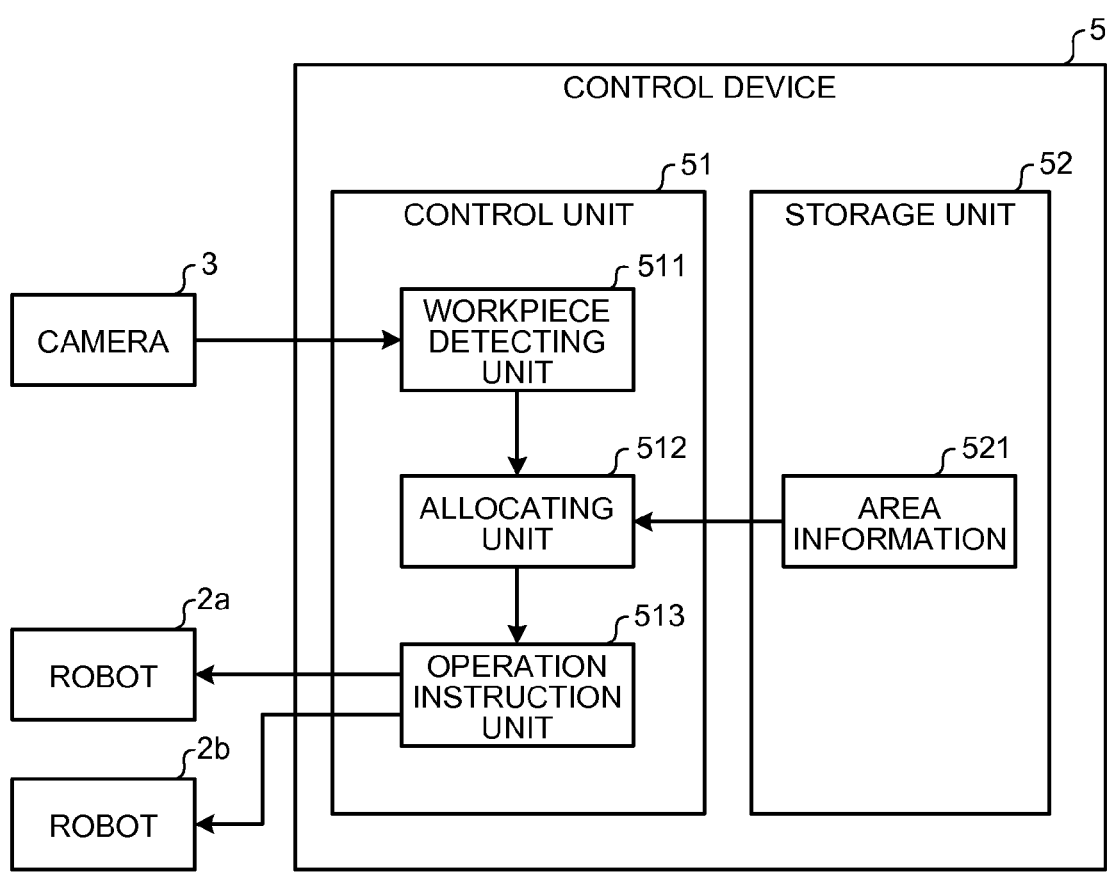
FIG. 2 is a block diagram illustrating the configuration of a control device according to the first embodiment.

FIG. 2 is a block diagram illustrating the configuration of a control device 5 according to the first embodiment. Only components needed to explain the characteristic of the control device are illustrated in FIG. 2. The descriptions on general components are omitted. The control device 5 is constituted by a single processor or a combination of a plurality of processors communicably connected to each other.

As illustrated in FIG. 2, the control device 5 includes a control unit 51 and a storage unit 52. The control unit 51 includes a workpiece detecting unit 511, an allocating unit 512, and an operation instruction unit 513. The storage unit 52 stores therein area information 521.

The control unit 51 totally controls the control device 5. The workpiece detecting unit 511 is a processing unit that detects the workpieces w on the conveying path 11 on the basis of the image input from the camera 3 and also outputs the detection result to the allocating unit 512. In this way, the workpiece detecting unit 511 is an example of the workpiece detecting device. In this case, the detection of the workpieces w performed by the workpiece detecting unit 511 may use any well-known technology.

The allocating unit 512 is a processing unit that performs an allocation process for determining which of the robots 2a and 2b receives an operation instruction to be transmitted by the operation instruction unit 513 on the basis of the conveying situations of the workpieces w obtained from the detection result of the workpiece detecting unit 511. More specifically, the allocation process is a process for determining which of the robots 2a and 2b performs the holding operation on the workpieces w by using the detection result of the workpieces w received from the workpiece detecting unit 511 and the area information 521 stored in the storage unit 52. The specific contents of the allocation process are explained with reference to FIG. 3B.

The allocating unit 512 outputs allocation information, which associates the robots 2a and 2b for performing the holding operation with the workpieces w detected by the workpiece detecting unit 511, and the detection result of the workpieces w to the operation instruction unit 513.

The operation instruction unit 513 is a processing unit that generates an operation instruction indicating the holding operation of the workpieces w on the basis of the detection result of the workpiece detecting unit 512 and transmits the operation instruction to the robots 2a and 2b corresponding to the information received from the allocating unit 512. More specifically, the operation instruction unit 513 makes the robots 2a and 2b associated with the workpieces w execute the holding operation of the workpieces w.

The storage unit 52 is constituted by a storage device such as for example a nonvolatile memory and a hard disk drive to store the area information 521. The area information 521 defines divided areas obtained by dividing the image area of the image captured by the camera 3 and associates the robots 2a and 2b with the respective divided areas.

Figure 3A:
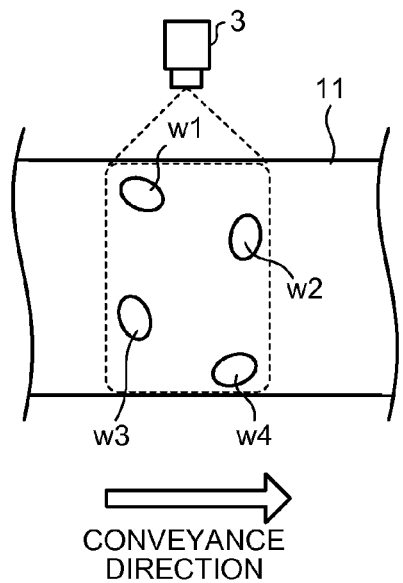
FIG. 3A is a diagram illustrating an example of a detection process that is performed by a workpiece detecting unit.
Figure 3B:
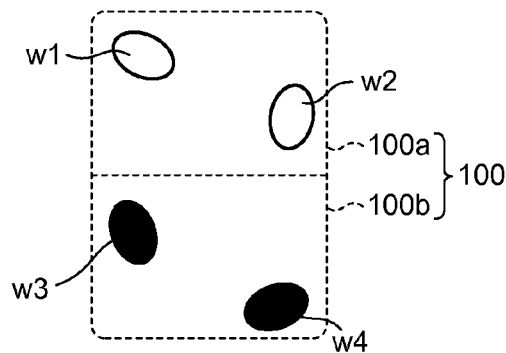
FIG. 3B is a diagram illustrating an operation example of an allocation process that is performed by an allocating unit.
Figure 3C:
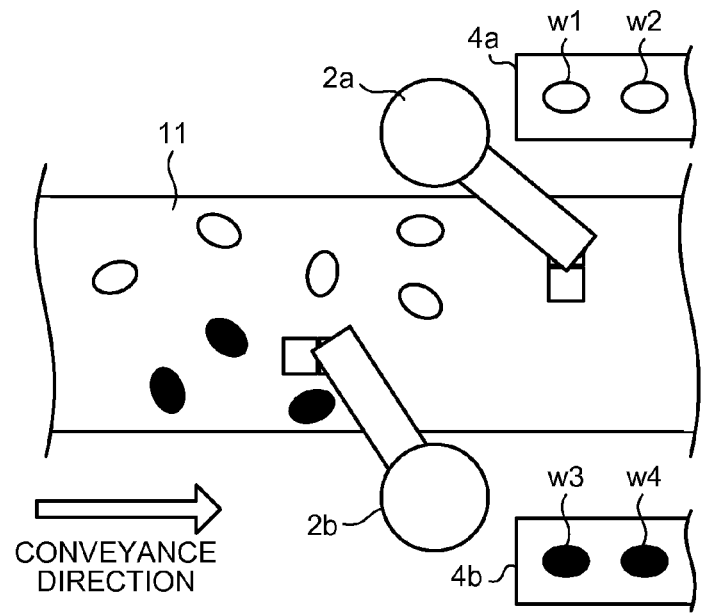
FIG. 3C is a diagram illustrating an operation example of a robot.

Next, an operation example of the robot system according to the first embodiment is explained with reference to FIGS. 3A to 3C. FIG. 3A is a diagram illustrating an example of a detection process that is performed by the workpiece detecting unit 511. FIG. 3B is a diagram illustrating an operation example of an allocation process that is performed by the allocating unit 512. FIG. 3C is a diagram illustrating an operation example of the robots 2a and 2b.

Herein, it is assumed that the workpieces w1 to w4 are captured by the camera 3 as illustrated in FIG. 3A. In this case, the workpiece detecting unit 511 detects the workpieces w1 to w4 and outputs information such as the positions and postures of the workpieces w1 to w4 to the allocating unit 512 as the detection result.

Next, the allocating unit 512 performs the allocation process on the workpieces w1 to w4 by using the detection result of the workpiece detecting unit 511 and the area information 521.

More specifically, as illustrated in FIG. 3B, an image area 100 of the image captured by the camera 3 is divided into two divided areas 100a and 100b by the area information 521. The divided areas 100a and 100b are areas obtained by dividing the image area 100 in parallel with the conveyance direction of the workpieces w. Herein, because the robot system includes the two robots 2a and 2b, the image area 100 is divided into the two divided areas 100a and 100b.

Each of the divided areas 100a and 100b is associated with any one of the robots 2a and 2b. Herein, it is assumed that the robot 2a is associated with the divided area 100a and the robot 2b is associated with the divided area 100b.

In other words, the divided area 100a closer to the robot 2a is associated with the robot 2a and the divided area 100b closer to the robot 2b is associated with the robot 2b. However, the association between "the divided areas 100a and 100b" and "the robots 2a and 2b" is not limited to this. Therefore, the association may be set in such a manner that the robots 2a and 2b have the highest work efficiency.

For example, when the robot 2a can perform the holding operation and the moving operation on the workpieces w belonging to the divided area 100b at higher speed than that of the workpieces w belonging to the divided area 100a, the robot 2a may be associated with the divided area 100b.

Next, the allocating unit 512 specifies which of the divided areas 100a and 100b to which each of the workpieces w1 to w4 belongs. Herein, as illustrated in FIG. 3B, the workpiece w1 and the workpiece w2 are located within the divided area 100a and the workpiece w3 and the workpiece w4 are located within the divided area 100b. For this reason, the allocating unit 512 specifies that the workpiece w1 and the workpiece w2 belong to the divided area 100a and that the workpiece w3 and the workpiece w4 belong to the divided area 100b. Hereinafter, it is assumed that the workpieces w belonging to the divided area 100b are illustrated by a black color to make the comprehension of the present art easy.

It is considered that the workpiece w is located over the divided areas 100a and 100b. In this case, the allocating unit 512 may specify a divided area to which the workpiece w located over the divided areas 100a and 100b should belong, in such a manner that the number of the workpieces w belonging to the divided area 100a is the same as that of the divided area 100b, for example.

For example, when the six workpieces w are detected by the workpiece detecting unit 511, it is assumed that the two workpieces w are located within the divided area 100a, the three workpiece w are located within the divided area 100b, and the one workpiece w is located over the divided areas 100a and 100b. In such a case, the allocating unit 512 specifies the workpiece w located over the divided areas 100a and 100b as the workpiece w belonging to the divided area 100a. As a result, because the number of the workpieces w belonging to the divided area 100a is the same as that of the divided area 100b and thus the processing loads of the robots 2a and 2b are balanced, the degradation of work efficiency can be prevented.

When the number of the workpieces w belonging to the divided area 100a is the same as that of the divided area 100b, the allocating unit 512 may specify one of the divided areas 100a and 100b that includes the large part of the workpiece w located over the divided areas 100a and 100b as a divided area to which the workpiece w should belong. As a result, the holding operation and the moving operation can be more effectively performed on the workpiece w.

Herein, it has been explained that the sizes of the divided areas 100a and 100b are the same. However, the embodiment is not limited to this. Therefore, the sizes of the divided areas 100a and 100b may be determined in accordance with the operating speeds of the robots 2a and 2b. For example, when the robot 2a has an operating speed faster than that of the robot 2b, the divided area 100a corresponding to the robot 2a may be larger than the divided area 100b corresponding to the robot 2b.

Particularly, because a difference between operating speeds may become large when a robot including a single-link mechanism and a robot including a multi-link mechanism are used together, the workpieces w can be appropriately allocated by determining the sizes of the divided areas 100a and 100b in accordance with the operating speeds.

When the divided areas 100a and 100b to which the workpieces w1 to w4 belong are specified, the allocating unit 512 generates allocation information that associates the workpieces w1 and w2 with the divided area 100a and the workpieces w3 and w4 with the divided area 100b. Then, the allocating unit 512 outputs the generated allocation information and the detection result of the workpieces w1 to w4 to the operation instruction unit 513.

Next, the operation instruction unit 513 instructs the robots 2a and 2b to perform the holding operation and the moving operation on the workpieces w1 to w4 by using the allocation information and the detection result of the workpieces w1 to w4. More specifically, the operation instruction unit 513 instructs the robot 2a to perform the holding operation on the workpieces w1 and w2 that belong to the divided area 100a corresponding to the robot 2a by the determination. Moreover, the operation instruction unit 513 instructs to the robot 2b to perform the holding operation on the workpieces w3 and w4 that belong to the divided area 100b corresponding to the robot 2b by the determination.

As a result, as illustrated in FIG. 3C, the robot 2a sequentially holds the workpieces w1 and w2 and moves them to the conveyer 4a in accordance with the instruction of the operation instruction unit 513. Moreover, the robot 2b sequentially holds the workpieces w3 and w4 and moves them to the conveyer 4b in accordance with the instruction of the operation instruction unit 513. After that, similarly, the robot 2a performs the holding operation and the moving operation on the workpieces w that belong to the divided area 100a by the determination and the robot 2b performs the holding operation and the moving operation on the workpieces w that belong to the divided area 100b by the determination.

As described above, it has been explained in the first embodiment that the control device 5 instructs the robots 2a and 2b corresponding to the respective divided areas 100a and 100b to perform the holding operation on the workpieces w belonging to the respective divided areas 100a and 100b for the respective divided areas 100a and 100b obtained by dividing the image area 100 of the image captured by the camera 3 in parallel with the conveyance direction of the workpieces w. As a result, the robot system can equally disperse the processing loads of the robots 2a and 2b as compared to a robot system. For this reason, the robot system can totally raise work efficiency.

Second Embodiment

Next, the second embodiment will be explained.

Meanwhile, the workpieces w may be conveyed as they are inclined to the right side or the left side with respect to the conveyance direction depending on the contents of the operation process performed at the upper stream side than the camera 3. In such a case, either the robot 2a or the robot 2b has the higher processing load and thus the total work efficiency of the robot system may be decreased.

Therefore, the robot system may calculate an inclination of the workpieces w on the conveying path 11 and adjust the sizes of the divided areas 100a and 100b in accordance with the calculated inclination. Hereinafter, this case is explained. In the following descriptions, the same components as those explained already have the same reference numbers and the overlapping explanation is omitted.

Figure 4:
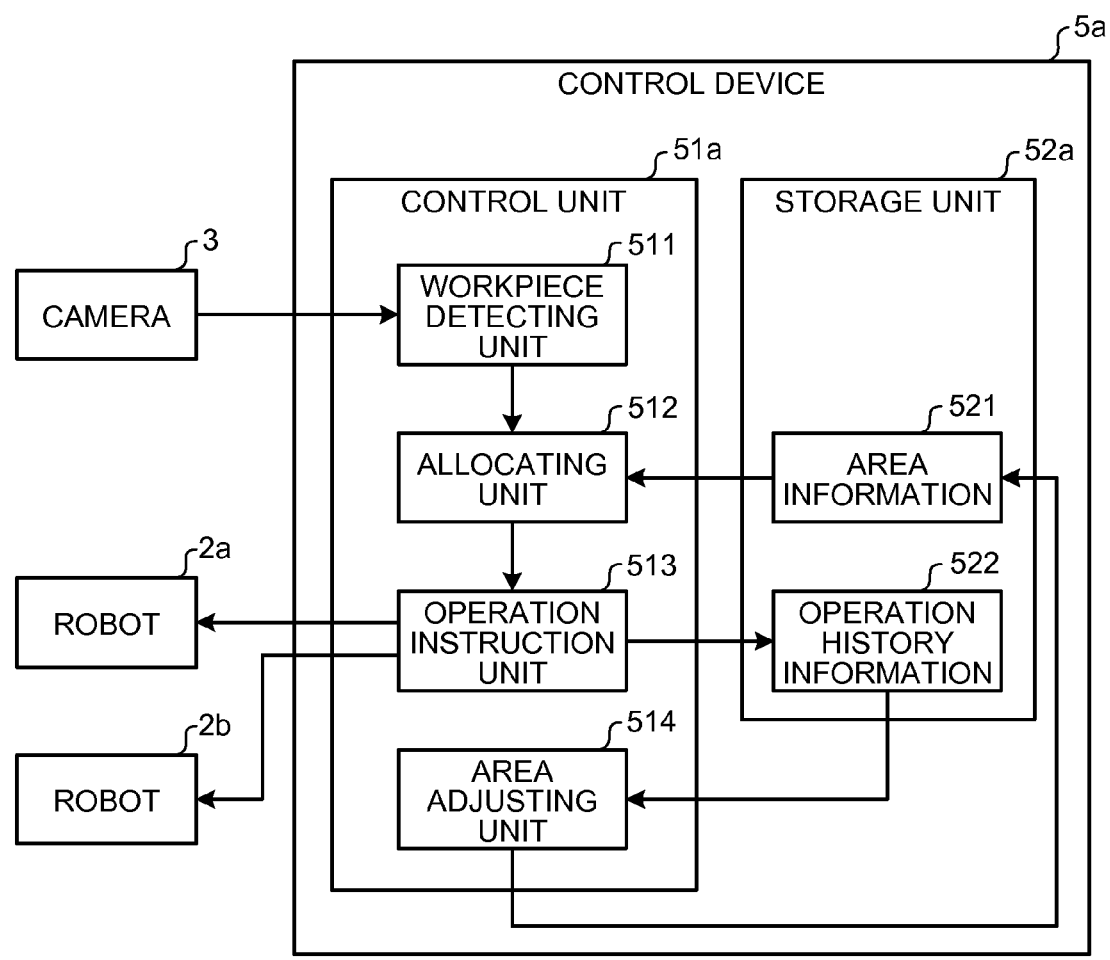
FIG. 4 is a block diagram illustrating the configuration of a control device according to a second embodiment.

First, the configuration of a control device according to the second embodiment is explained with reference to FIG. 4. FIG. 4 is a block diagram illustrating the configuration of a control device 5a according to the second embodiment.

As illustrated in FIG. 4, the control device 5a according to the second embodiment includes a control unit 51a and a storage unit 52a. The control unit 51a further includes an area adjusting unit 514 in addition to the processing units of the control unit 51 of the control device 5 according to the first embodiment. Moreover, the storage unit 52a further stores operation history information 522 in addition to the area information 521 stored in the storage unit 52 of the control device 5 according to the first embodiment.

The operation history information 522 is information for storing the number of the workpieces w processed by each of the robots 2a and 2b, that is to say, the number of the workpieces w on which each of the robots 2a and 2b performs the holding operation. The operation history information 522 is updated by the operation instruction unit 513 whenever the operation instruction unit 513 instructs each of the robots 2a and 2b to perform the holding operation on the workpiece w.

The operation instruction unit 513 may update the operation history information 522 whenever the operation instruction unit 513 does not instruct each of the robots 2a and 2b to perform the holding operation on the workpiece w but receives the effect that the holding operation and the moving operation are completed from each of the robots 2a and 2b, or may regularly update the operation history information 522.

The area adjusting unit 514 is a processing unit that performs an area adjustment process for adjusting the sizes of the divided areas 100a and 100b on the basis of the operation history information 522.

Figures 5A, 5B:
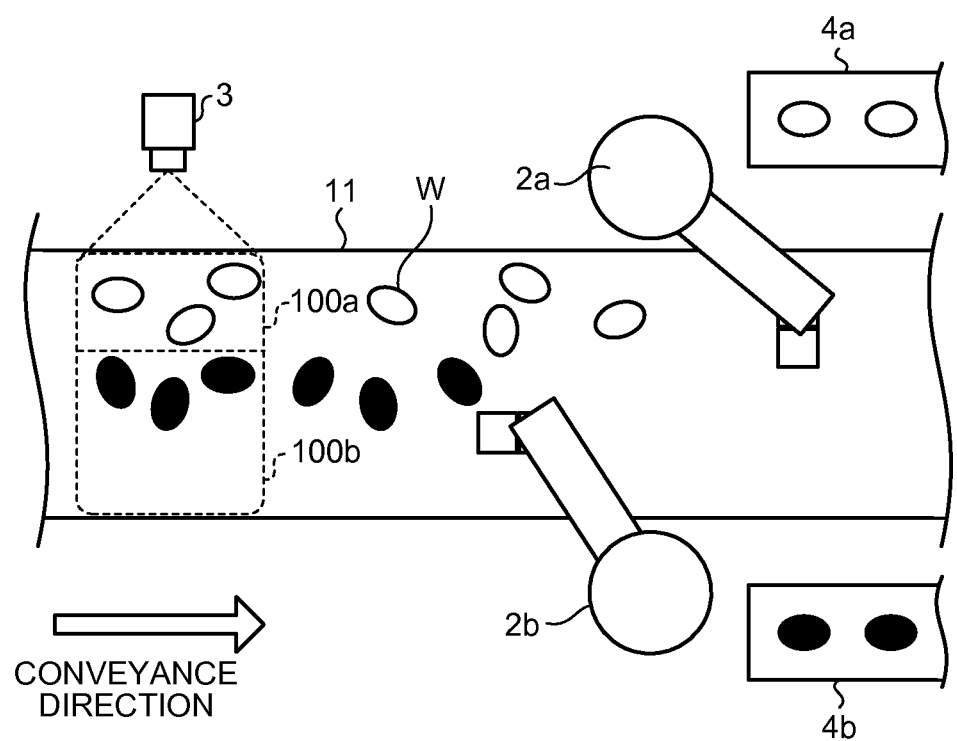
FIG. 5A is a diagram illustrating an example of operation history information.
FIG. 5B is a diagram illustrating an example of a divided area after an area adjustment process.

Herein, the specific contents of the area adjustment process performed by the area adjusting unit 514 is explained with reference to FIGS. 5A and 5B. FIG. 5A is a diagram illustrating an example of the operation history information 522. FIG. 5B is a diagram illustrating an example of the divided areas 100a and 100b after the area adjustment process.

As illustrated in FIG. 5A, the operation history information 522 is information that associates each of the robots 2a and 2b with the number of the processed workpieces w. In an example illustrated in FIG. 5A, "100" is associated with "the robot 2a" and "50" is associated with "the robot 2b". According to the operation history information 522, it turns out that the workpieces w are conveyed as they are inclined to the left side with respect to the conveyance direction.

Next, as illustrated in FIG. 5B, the area adjusting unit 514 adjusts divided areas in such a manner that the divided area 100a corresponding to the robot 2a becomes smaller than the divided area 100b corresponding to the robot 2b.

For example, in the example illustrated in FIG. 5A, the number of processes of the robot 2a is two times of the number of processes of the robot 2b. In this case, the area adjusting unit 514 changes the sizes of the divided areas 100a and 100b in such a manner that the size of the divided area 100a corresponding to the robot 2a becomes one-half of the size of the divided area 100b corresponding to the robot 2b. In this way, the area adjusting unit 514 changes the sizes of the divided areas 100a and 100b in accordance with a ratio between the numbers of workpieces processed by the robots 2a and 2b.

As a result, as illustrated in FIG. 5B, the processing loads of the robots 2a and 2b can be balanced even if the workpieces w are conveyed as they are inclined to one side, and thus the degradation of total work efficiency of the robot system can be prevented.

As described above, it has been explained in the second embodiment that the control device 5a calculates an inclination of the workpieces w on the conveying path 11 and changes the sizes of the divided areas 100a and 100b in accordance with the calculated inclination. Therefore, even when the workpieces w tend to be inclined to any of left and right with respect to the conveyance direction, the degradation of work efficiency can be prevented.

The area adjusting unit 514 may change the sizes of the divided areas 100a and 100b in accordance with a value obtained by multiplying a predetermined coefficient (for example, 0.8) by the ratio between the numbers of workpieces processed by the robots 2a and 2b. Moreover, the area information 521 may be manually changed by a worker or the like.

It has been explained in the second embodiment that the control device calculates an inclination of the workpieces w on the conveying path 11 on the basis of the operation histories of the robots 2a and 2b. However, a method for calculating an inclination of the workpieces w on the conveying path 11 is not limited to this.

For example, the control device 5a may accumulate the detection results of the workpieces w performed by the workpiece detecting unit 511 in the storage unit 52a or the like, and calculate an inclination of the workpieces w on the conveying path 11 on the basis of the accumulated detection results. Moreover, the control unit 51a may accumulate the allocation information generated by the allocating unit 512 in the storage unit 52a or the like, and calculate an inclination of the workpieces w on the conveying path 11 on the basis of the accumulated allocation information.

It has been explained that the sizes of the divided areas 100a and 100b are changed on the basis of past information such as an operation history. However, the embodiment is not limited to this. For example, whenever an image is captured by the camera 3, the control device 5a calculates an area ratio of the workpieces w between the divided areas 100a and 100b. Then, the area adjusting unit 514 may change the sizes of the divided areas 100a and 100b in accordance with the calculated area ratio, and the allocating unit 512 may allocate the workpieces w on the basis of the changed divided areas 100a and 100b.

In this way, assuming that, whenever an image is captured by the camera 3, an area ratio of the workpieces w between the divided areas 100a and 100b of the image is calculated as an inclination of the workpieces w on the conveying path 11, the sizes of the divided areas 100a and 100b can be adjusted in real time.

It has been explained in the first and second embodiments that the image area 100 of the image captured by the camera 3 is divided in parallel with the conveyance direction of the workpiece w. However, the division method of the image area 100 is not limited to this.

Figure 6A:
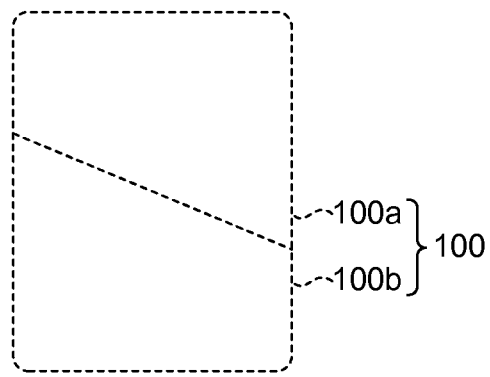
FIG. 6A is a diagram illustrating another division example of an image area.
Figure 6B:
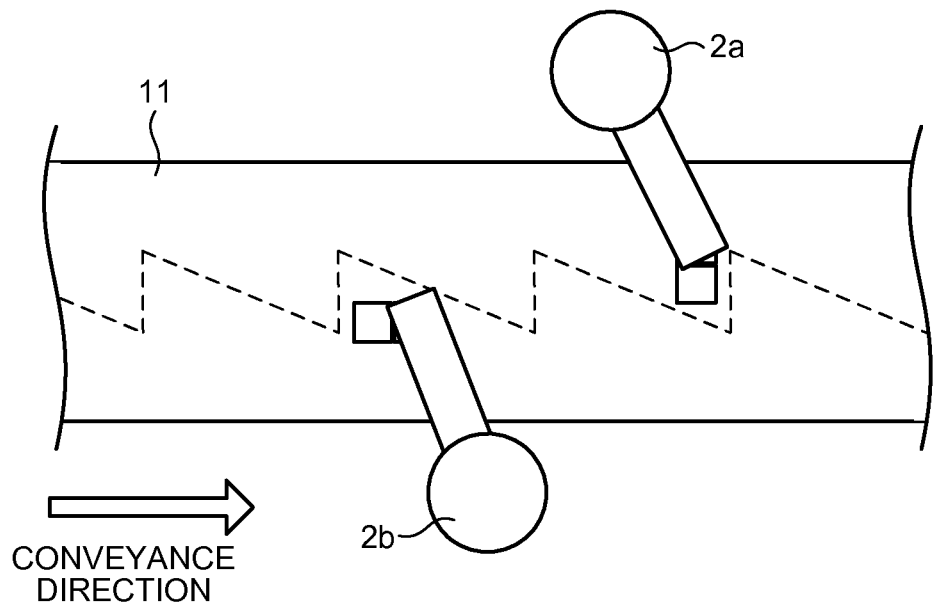
FIG. 6B is a diagram illustrating a work area for each robot.

Hereinafter, another division method of the image area 100 is explained with reference to FIGS. 6A and 6B. FIG. 6A is a diagram illustrating another division example of the image area 100. FIG. 6B is a diagram illustrating work areas for the robots 2a and 2b.

For example, as illustrated in FIG. 6A, the divided areas 100a and 100b may be areas obtained by diagonally dividing the image area 100 with respect to the conveyance direction of the workpiece w. When the image area 100 is diagonally divided, areas obtained by dividing the conveying path 11 in a zigzag pattern with respect to the conveyance direction become the work areas for the robots 2a and 2b as illustrated in FIG. 6B. By forming the work areas for the robots 2a and 2b in a zigzag pattern in this way, work efficiency can be improved depending on the structure and arrangement of the robots 2a and 2b or the inclination of the workpieces w on the conveying path 11.

The image area 100 is not necessarily divided in a linear fashion. Therefore, the image area 100 may be divided in a curved line.

The division method of the image area 100 may be determined in accordance with an installation interval of the robots 2a and 2b in the conveyance direction. For example, when the installation interval of the robots 2a and 2b is narrow, the image area 100 may be divided in a zigzag pattern.

Figure 7:
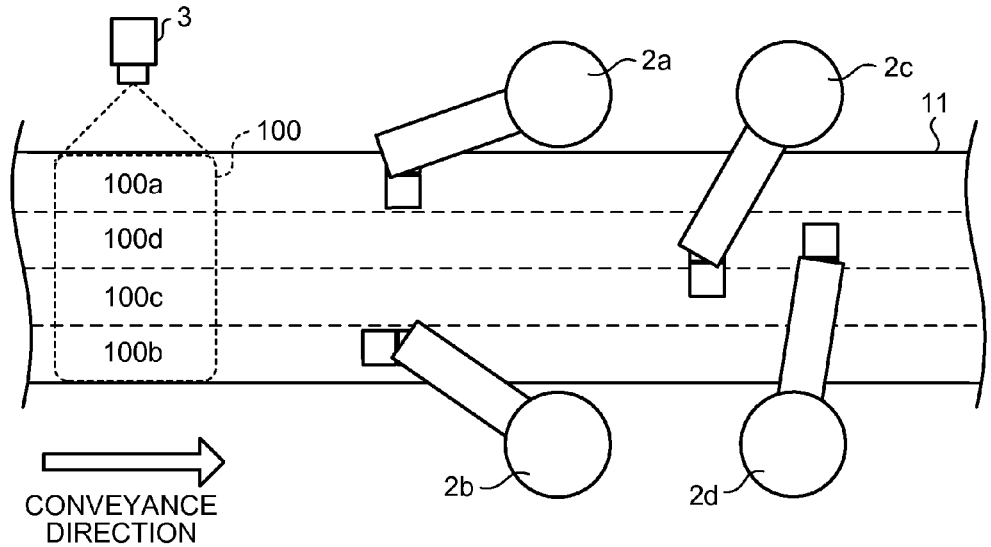
FIG. 7 is a diagram illustrating another example of the robot system.

It has been explained the first and second embodiments that the robot system includes the two robots 2a and 2b as an example. However, the robot system may include three or more robots. Hereinafter, a robot system including four robots 2a to 2d is explained as an example with reference to FIG. 7. FIG. 7 is a diagram illustrating another example of the robot system.

As illustrated in FIG. 7, when the robot system includes the four robots 2a to 2d, it is only sufficient that the image area 100 of the image captured by the camera 3 is divided into four in parallel with the conveyance direction. In other words, the image area 100 is divided into four areas of divided areas 100a to 100d. Moreover, the divided areas 100a to 100d are respectively associated with the robots 2a to 2d.

Herein, when the holding operation and the moving operation are performed on the workpieces w, coadjacent robots easily cause interference such as contact. Therefore, it is preferable that coadjacent robots are respectively associated with divided areas that are not coadjacent. As a result, it is hard to cause interference between the robots.

For example, the robots 2a and 2c are placed at coadjacent positions. For this reason, it is preferable that the robot 2a is associated with the divided area 100a and the robot 2c is associated with the divided area 100c that is not adjacent to the divided area 100a. Similarly, the robots 2b and 2d are placed at coadjacent positions. For this reason, it is preferable that the robot 2b is associated with the divided area 100b and the robot 2d is associated with the divided area 100d that is not adjacent to the divided area 100b. By doing so, it is hard to cause interference between the robots.

Herein, it has been explained that the robots adjacent along the conveyance direction are respectively associated with the divided areas that are not adjacent. However, the embodiment is not limited to this. For example, like the robots 2a and 2b, the robots facing each other while placing the conveying path 11 therebetween may be respectively associated with the divided areas that are not adjacent.

Third Embodiment

Next, the third embodiment will be explained. Herein, the same components as those explained already have the same reference numbers and the overlapping explanations are omitted.

Figure 8:
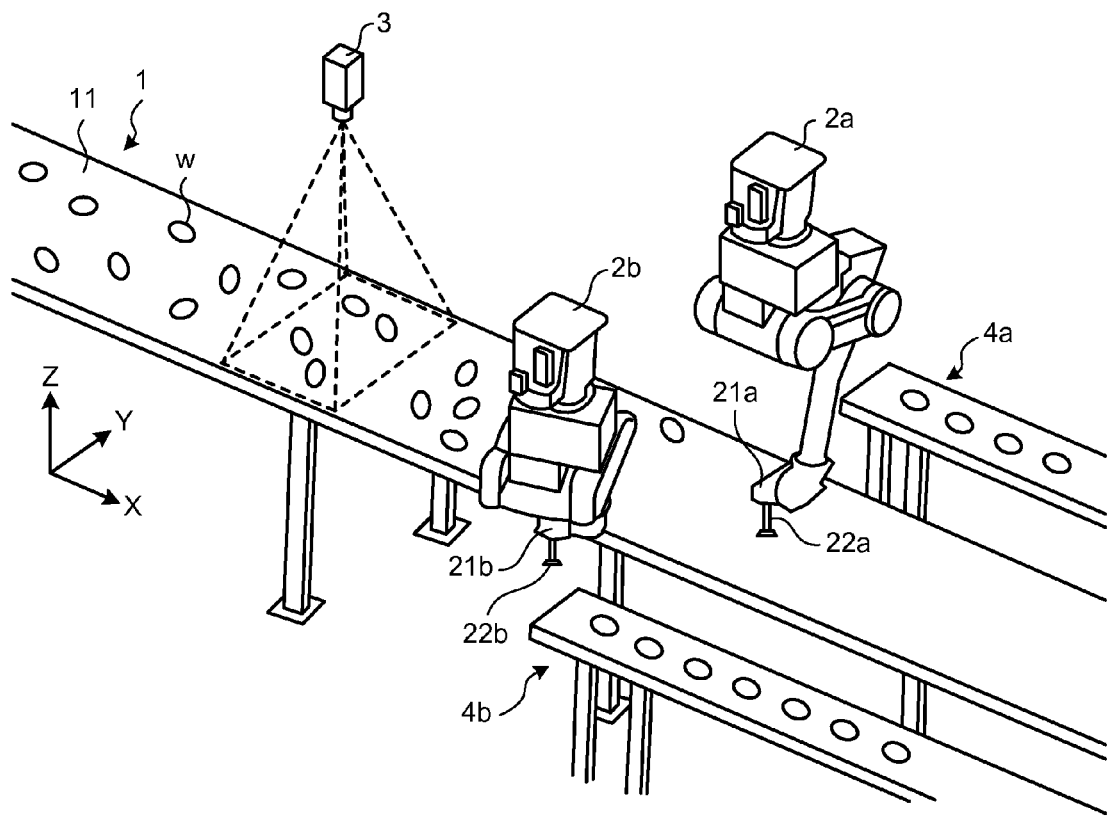
FIG. 8 is a pattern perspective view of a robot system according to a third embodiment.

First, the appearance of a robot system according to the third embodiment is explained with reference to FIG. 8. FIG. 8 is a pattern perspective view of the robot system according to the third embodiment. Hereinafter, similarly to the first and second embodiments, the robot system that includes two robots will be explained as an example.

As illustrated in FIG. 8, the robot system according to the third embodiment includes the conveyer 1, the robots 2a and 2b, and the camera 3.

The robots 2a and 2b respectively include arm leading ends 21a and 21b. Each of the arm leading ends 21a and 21b is provided with an end effector (holding device) that holds the workpiece w.

For example, the robots 2a and 2b respectively include, as an end effector, the adsorption units 22a and 22b that adsorb the workpieces w by using a suction device such as a vacuum pump to hold the workpieces w by using the adsorption units 22a and 22b. Moreover, the robots 2a and 2b respectively move the held workpieces w to the conveyers 4a and 4b and then place the held workpieces w on the conveyers 4a and 4b by removing attractive forces by the suction devices.

Herein, the robots 2a and 2b rotate the arm leading ends 21a and 21b and then perform the holding operation on the workpieces w in such a manner that the directions of the arm leading ends 21a and 21b become a predetermined direction with respect to the directions of the workpieces w when the workpieces w are held. The configuration of the arm leading ends 21a and 21b is described below with reference to FIG. 10.

When the holding operation and the moving operation are completed on the one workpiece w, each of the robots 2a and 2b returns to an initial posture set previously and starts the holding operation for the next workpiece w from the initial posture. Herein, the robots 2a and 2b according to the third embodiment have the respective different initial postures. This point is described below with reference to FIGS. 11A and 11B.

The robot system according to the third embodiment determines which of the robots 2a and 2b performs the holding operation on the workpiece w in accordance with the direction of the workpiece w. As a result, because a processing load is prevented from concentrating on one of the robots 2a and 2b and the holding operation or the like is performed on the workpiece w that has the posture by which each of the robots 2a and 2b easily holds the workpiece w, work efficiency can be raised. Hereinafter, the configuration and operation of the control device will be specifically explained.

Figure 9:
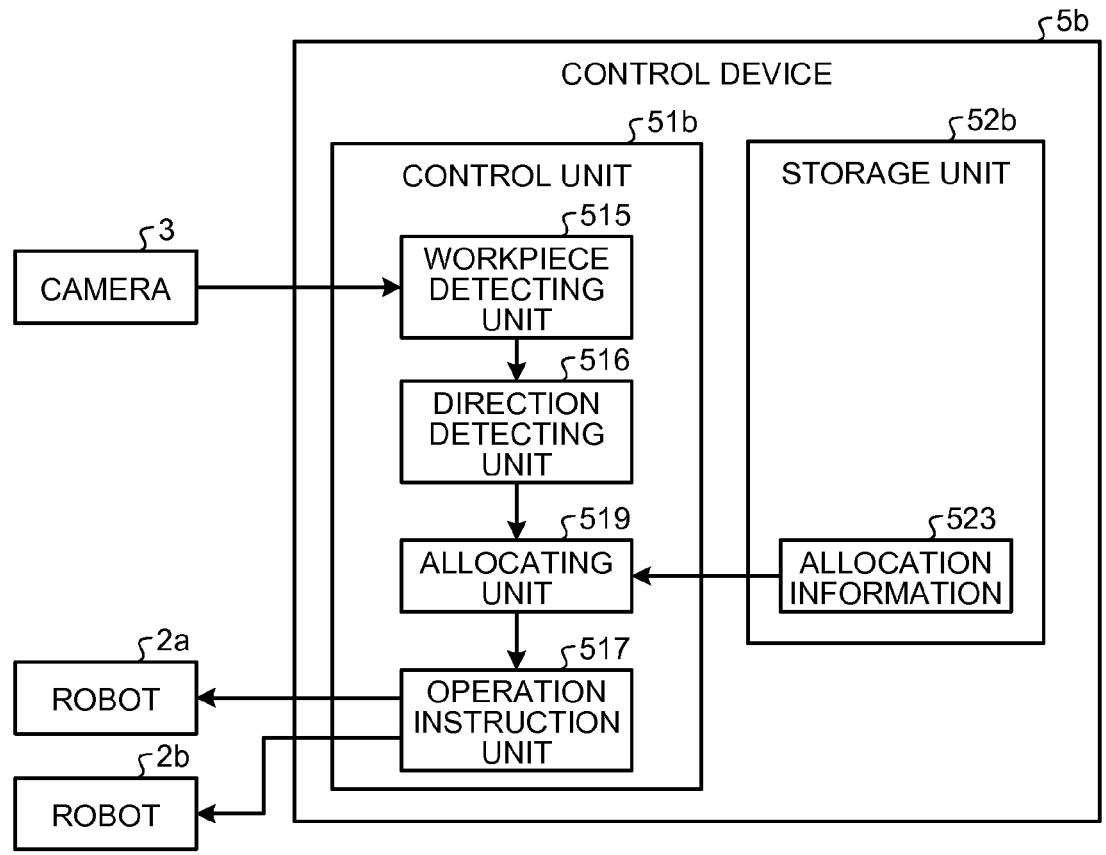
FIG. 9 is a block diagram illustrating the configuration of a control device according to the third embodiment.

FIG. 9 is a block diagram illustrating the configuration of a control device 5b according to the third embodiment. Herein, only components needed to explain the characteristic of the control device are illustrated in FIG. 9 and the descriptions on general components are omitted.

As illustrated in FIG. 9, the control device 5b includes a control unit 51b and a storage unit 52b. The control unit 51b includes a workpiece detecting unit 515, a direction detecting unit 516, an allocating unit 519, and an operation instruction unit 517. The storage unit 52b stores therein allocation information 523.

The control unit 51b totally controls the control device 5b. The workpiece detecting unit 515 is a processing unit that detects the workpieces w on the conveying path 11 on the basis of an image input from the camera 3. Moreover, upon detecting the workpieces w, the workpiece detecting unit 515 outputs the detection result including the position information of the workpieces w and the image captured by the camera 3 to the direction detecting unit 516. In this way, the workpiece detecting unit 515 is an example of a workpiece detecting device.

The direction detecting unit 516 is a processing unit that detects the directions of the workpieces w on the basis of the image captured by the camera 3. Moreover, upon detecting the directions of the workpieces w, the direction detecting unit 516 adds the detection result of the directions of the workpieces w to the detection result of the workpieces w performed by the workpiece detecting unit 515 and outputs the addition result to the allocating unit 519.

The detection of the workpieces w performed by the workpiece detecting unit 515 and the direction detection of the workpieces w performed by the direction detecting unit 516 may be performed by using any well-known technology. Herein, it has been explained that the detection process of the workpieces w and the direction detection process of the workpieces w are performed by different processing units. However, the processes may be performed by one processing unit in block.

The allocating unit 519 is a processing unit that performs a process for determining which of the robots 2a and 2b performs the holding operation and the moving operation on the workpieces w, on the basis of the detection result of the workpieces w received from the direction detecting unit 516 and the allocation information 523 stored in the storage unit 52b. The allocating unit 519 determines the robots 2a and 2b corresponding to the direction of the workpiece w as the robots 2a and 2b for performing the holding operation and the moving operation on the workpiece w. Moreover, when the robots 2a and 2b for performing the holding operation and the moving operation on the workpiece w is determined, the allocating unit 519 outputs information that is associated with the robots 2a and 2b for performing the holding operation and the detection result of the workpiece w to the operation instruction unit 517 for each the workpiece w detected by the workpiece detecting unit 515. The specific contents of the process executed by the allocating unit 519 are described below with reference to FIGS. 12A to 12C.

The operation instruction unit 517 is a processing unit that generates an operation instruction for performing the holding operation on the workpiece w on the basis of the detection result of the workpiece detecting unit 515 and transmits the operation instruction to the robots 2a and 2b corresponding to the information received from the allocating unit 519.

The storage unit 52b is constituted by a storage device such as for example a nonvolatile memory and a hard disk drive to store the allocation information 523. The allocation information 523 is information that associates the robots 2a and 2b with predetermined angular ranges.

Figure 10:
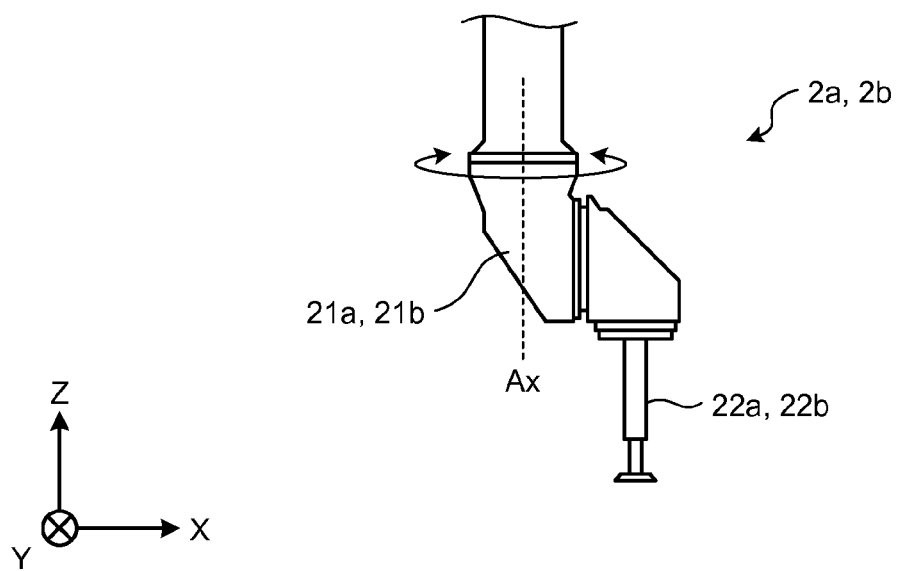
FIG. 10 is a pattern diagram of an arm leading end.

Herein, the contents of the allocation information 523 and the initial postures of the robots 2a and 2b will be explained. FIG. 10 is a pattern diagram of the arm leading ends 21a and 21b. Moreover, FIG. 11A is a diagram illustrating an example of the initial posture of the robot 2a. FIG. 11B is a diagram illustrating an example of the initial posture of the robot 2b.

As illustrated in FIG. 10, the arm leading ends 21a and 21b of the robots 2a and 2b are rotatably provided with a central focus on a rotation axis Ax. The robots 2a and 2b rotate the arm leading ends 21a and 21b with a focus on the rotation axis Ax in such a manner that the directions of the arm leading ends 21a and 21b become a predetermined direction with respect to the directions of the workpieces w, and then hold the workpieces w by using the adsorption units 22a and 22b. In addition, although specific explanations are omitted herein, the arm leading ends 21a and 21b have a rotation axis other than the rotation axis Ax. The robots 2a and 2b rotate the arm leading ends 21a and 21b with a central focus on a rotation axis other than the rotation axis Ax, if desired.

As described above, the robots 2a and 2b have the respective different initial postures. For example, as illustrated in FIG. 11A, the robot 2a has a posture, in which the arm leading end 21a is directed to the same direction as the conveyance direction of the conveyer 1, as an initial posture. Moreover, as illustrated in FIG. 11B, the robot 2b has a posture, in which the arm leading end 21b is directed to the direction vertical to the conveyance direction of the conveyer 1, as an initial posture.

As illustrated in FIG. 11A, the allocation information 523 associates the robot 2a with an angular range 200a of −45 degrees to +45 degrees (hereinafter, "first angular range 200a") when the conveyance direction of the conveyer 1 is a reference direction (zero degree). Moreover, as illustrated in FIG. 11B, the allocation information 523 associates the robot 2b with an angular range 200b of +45 degrees to +135 degrees (hereinafter, "second angular range 200b") when the conveyance direction of the conveyer 1 is the reference direction (zero degree).

In this way, in the third embodiment, the robots 2a and 2b are associated with the predetermined angular ranges that include angles formed by the reference direction and the directions of the arm leading ends 21a and 21b (or the adsorption units 22a and 22b) when the robots 2a and 2b take their initial postures.

Herein, it has been explained that the conveyance direction of the conveyer 1 is the reference direction. The reference direction may not necessarily be the conveyance direction.

Moreover, the set initial postures of the robots 2a and 2b are not limited to the postures illustrated in FIGS. 11A and 11B.

Figure 12A:
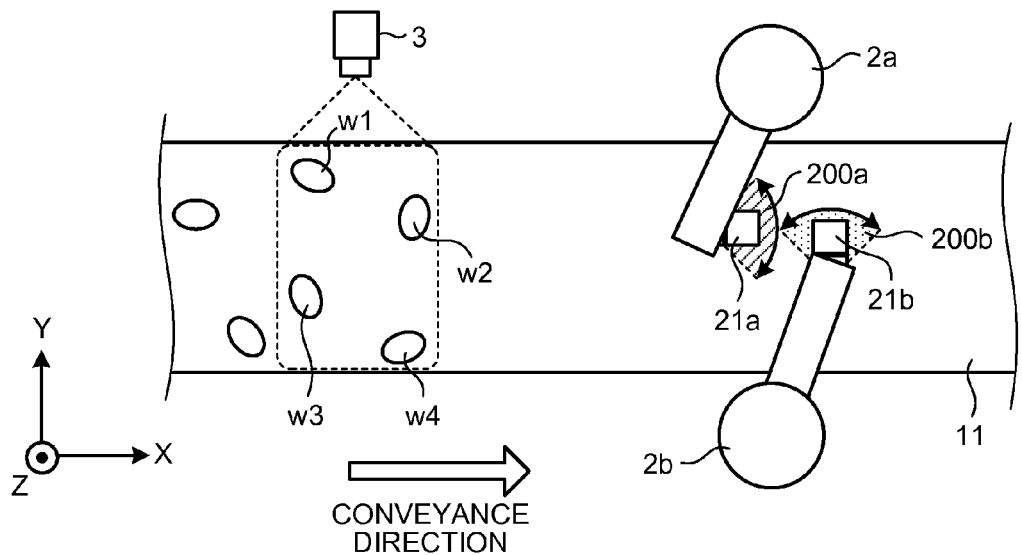
FIG. 12A is a pattern top view of the robot system.
Figure 12B:
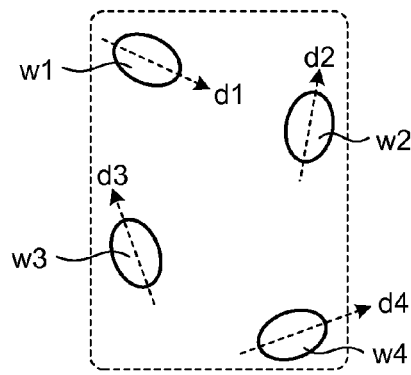
FIG. 12B is an explanation diagram of a direction detection process.
Figure 12C:
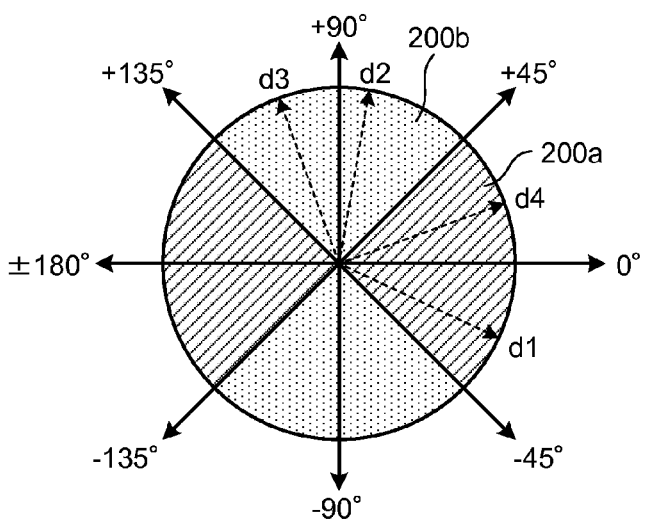
FIG. 12C is an explanation diagram of an allocation process.

Next, an operation example of the robot system according to the third embodiment is explained with reference to FIGS. 12A to 12C. FIG. 12A is a pattern top view of the robot system. FIG. 12B is an explanation diagram of a direction detection process. FIG. 12C is an explanation diagram of an allocation process.

As illustrated in FIG. 12A, it is assumed that the camera 3 captures the workpieces w1 to w4 and the workpiece detecting unit 515 detects the workpieces w1 to w4. In this case, as illustrated in FIG. 12B, the direction detecting unit 516 detects directions d1 to d4 of the workpieces w1 to w4 detected by the workpiece detecting unit 515.

Next, the allocating unit 519 calculates angles that are formed by the reference direction (the conveyance direction in the third embodiment) and the directions d1 to d4 of the workpieces w1 to w4 detected by the direction detecting unit 516. Then, the allocating unit 519 determines the robots 2a and 2b associated with angular ranges including the calculated angles as robots that perform the holding operation on the workpieces w1 to w4.

For example, as illustrated in FIG. 12C, the direction d1 of the workpiece w1 and the direction d4 of the workpiece w4 are included in the first angular range 200a associated with the robot 2a. For this reason, the allocating unit 519 determines the robot 2a as a robot that performs the holding operation and the moving operation on the workpiece w1 and the workpiece w4.

The direction d2 of the workpiece w2 and the direction d3 of the workpiece w3 are included in the second angular range 200b associated with the robot 2b. For this reason, the allocating unit 519 determines the robot 2b as a robot that performs the holding operation and the moving operation on the workpiece w2 and the workpiece w3. Moreover, as illustrated in FIG. 12C, the robot 2a may be further associated with the angular range of +135 degrees to +180 degrees and the angular range of −135 degrees to −180 degrees and the robot 2b may be further associated with the angular range of −45 degrees to −135 degrees.

As described above, it has been explained in the third embodiment that the workpiece detecting unit 515 further detects the direction of the workpiece w on the basis of the image captured by the camera 3 and the control device 5b instructs the robots 2a and 2b corresponding to the detected direction of the workpiece w to perform the holding operation on the workpiece w. More specifically, it has been explained that the control device 5b associates the robots 2a and 2b with respective predetermined angular ranges and instructs the robots 2a and 2b associated with the respective angular ranges including angles formed by the detected directions of the workpieces w and the predetermined reference direction to perform the holding operation on the workpieces w.

As a result, the processing loads of the robots 2a and 2b can be equally dispersed. For this reason, total work efficiency of the robot system can be raised.

It has been explained in the third embodiment that the control device 5b associates the robots 2a and 2b with predetermined angular ranges that include angles formed by the directions of the adsorption units 22a and 22b and the predetermined reference direction when the robots 2a and 2b take their initial postures.

As a result, rotation amounts of the arm leading ends 21a and 21b when the robots 2a and 2b hold the workpieces w can be reduced. In this way, because each of the robots 2a and 2b holds the workpiece w that is directed to the direction in which the workpiece can be easily held, the holding operations of the robots 2a and 2b can be speeded up and thus work efficiency can be further raised.

Fourth Embodiment

Next, the fourth embodiment will be explained.

The directions of the workpieces w may be inclined depending on the contents of an operation process performed at the upper stream side than the camera 3. In such a case, any of the robots 2a and 2b has the inclined processing load and thus total work efficiency of the robot system may be decreased.

Therefore, the sizes of the first angular range 200a and the second angular range 200b associated with the robots 2a and 2b may be adjusted in accordance with workloads of the robots 2a and 2b. Hereinafter, this case is explained. Herein, the same components as those explained already have the same reference numbers and the overlapping explanations are omitted.

Figure 13:
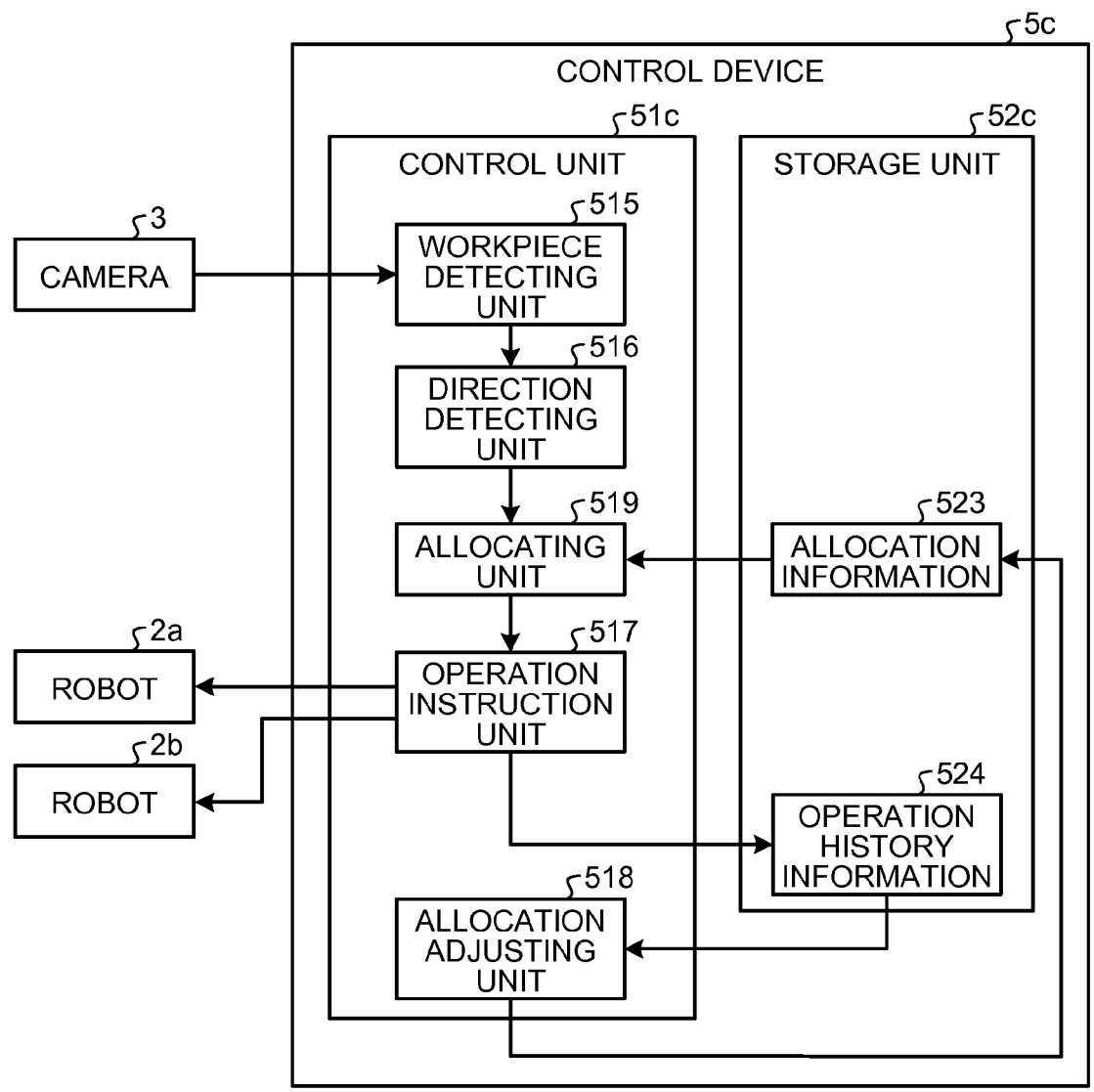
FIG. 13 is a block diagram illustrating the configuration of a control device according to a fourth embodiment.

First, the configuration of a control device according to the fourth embodiment is explained with reference to FIG. 13. FIG. 13 is a block diagram illustrating the configuration of a control device 5c according to the fourth embodiment.

As illustrated in FIG. 13, the control device 5c according to the fourth embodiment includes a control unit 51c and a storage unit 52c. The control unit 51c further includes an allocation adjusting unit 518 in addition to the processing units included in the control unit 51b of the control device 5b according to the third embodiment. Moreover, the storage unit 52c further stores operation history information 524 in addition to the allocation information 523 stored in the storage unit 52b of the control device 5b according to the third embodiment.

The operation history information 524 is information for storing the number of the workpieces w processed by each of the robots 2a and 2b, that is to say, the number of the workpieces w on which each of the robots 2a and 2b performs the holding operation. The operation history information 524 is updated by the operation instruction unit 517 whenever the operation instruction unit 517 instructs each of the robots 2a and 2b to perform the holding operation on the workpieces w.

The operation instruction unit 517 may update the operation history information 524 whenever the operation instruction unit 517 does not instruct each of the robots 2a and 2b to perform the holding operation on the workpieces w but receives the effect that the holding operation and the moving operation are completed from each of the robots 2a and 2b, or may regularly update the operation history information 524.

The allocation adjusting unit 518 is a processing unit that performs an area adjustment process for adjusting the sizes of the first angular range 200a and the second angular range 200b on the basis of the operation history information 524.

Figures 14A, 14B:
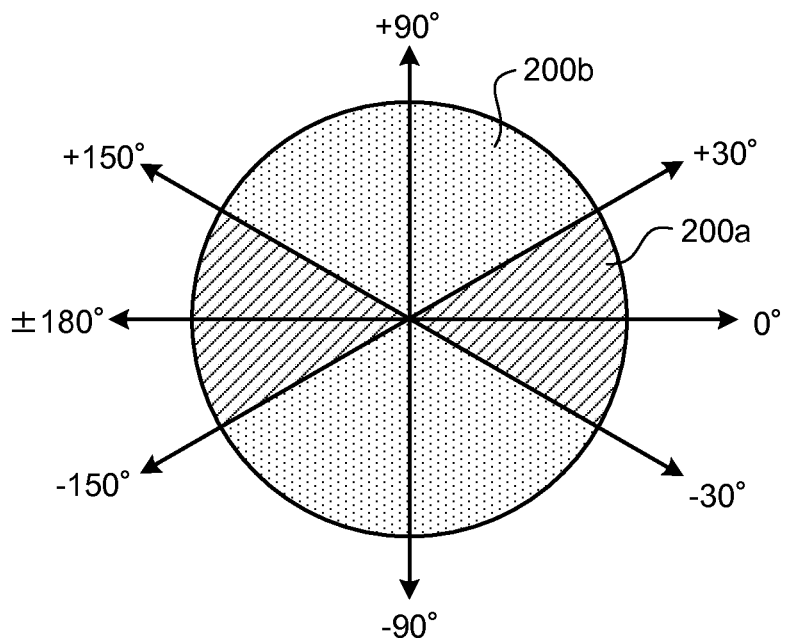
FIG. 14A is a diagram illustrating an example of operation history information.
FIG. 14B is a diagram illustrating an example of a first angular range and a second angular range after an allocation adjustment process.

Herein, the specific contents of the allocation adjustment process performed by the allocation adjusting unit 518 is explained with reference to FIGS. 14A and 14B. FIG. 14A is a diagram illustrating an example of the operation history information 524. FIG. 14B is a diagram illustrating an example of the first angular range 200a and the second angular range 200b after the allocation adjustment process.

As illustrated in FIG. 14A, the operation history information 524 is information that associates each of the robots 2a and 2b with the number of the processed workpieces w. In an example illustrated in FIG. 14A, "100" is associated with "the robot 2a" and "50" is associated with "the robot 2b". According to the operation history information 524, it turns out that the workpieces w that have angles in the first angular range 200a are conveyed more than the workpieces w that have angles in the second angular range 200b.

Next, as illustrated in FIG. 14B, the allocation adjusting unit 518 adjusts angular ranges in such a manner that the first angular range 200a associated with the robot 2a is smaller than the second angular range 200b associated with the robot 2b.

For example, in the example illustrated in FIG. 14A, the number of the workpieces processed by the robot 2a is two times of the number of the workpieces processed by the robot 2b. Therefore, the allocation adjusting unit 518 changes the sizes of the first angular range 200a and the second angular range 200b in such a manner that the size of the first angular range 200a associated with the robot 2a becomes one-half of the size of the second angular range 200b associated with the robot 2b. In this way, the allocation adjusting unit 518 may change the sizes of the first angular range 200a and the second angular range 200b in accordance with a ratio between the numbers of the workpieces processed by the robots 2a and 2b.

As described above, it has been explained in the fourth embodiment that the control device 5c changes the sizes of the first angular range 200a and the second angular range 200b in accordance with the workloads of the robots 2a and 2b. For this reason, even if the directions of the workpieces w are inclined to one side, the degradation of work efficiency can be prevented.

The allocation adjusting unit 518 may change the sizes of the first angular range 200a and the second angular range 200b in accordance with a value obtained by multiplying a predetermined coefficient (for example, 0.8) by the ratio between the numbers of the workpieces processed by the robots 2a and 2b. Moreover, the allocation information 523 may be manually changed by a worker or the like.

Herein, it has been explained that the operation history information 524 is used as the workloads of the robots 2a and 2b. However, the embodiment is not limited to this. For example, the allocation adjusting unit 518 may accumulate the detection results of the directions of the workpieces w performed by the direction detecting unit 516 in the storage unit 52c, calculate statistics of the directions of the workpieces w from the accumulated detection results, and use the calculated statistical result as the workload of each of the robots 2a and 2b.

The control device 5c may change the initial postures of the robots 2a and 2b on the basis of the detected statistics of the directions of the workpieces w.

For example, the control device 5c calculates an average value of angles, which are formed by the predetermined reference direction (herein, the conveyance direction) and the directions of the workpieces w included in the first angular range 200a, from the accumulated detection results of the directions of the workpieces w. Then, the control device 5c may set, as a new initial posture, a posture in which angles formed by the directions of the arm leading ends 21a and 21b and the reference direction (herein, the conveyance direction) are identical with the average value.

In other words, when an average value of angles formed by the predetermined reference direction and the directions of the workpieces w included in the first angular range 200a is −10 degrees, a posture in which the angles formed by the reference direction and the directions of the arm leading ends 21a and 21b are −10 degrees is set as a new initial posture. By doing so, the further speed-up of the holding operation of each of the robots 2a and 2b can be achieved.

Figure 15A:
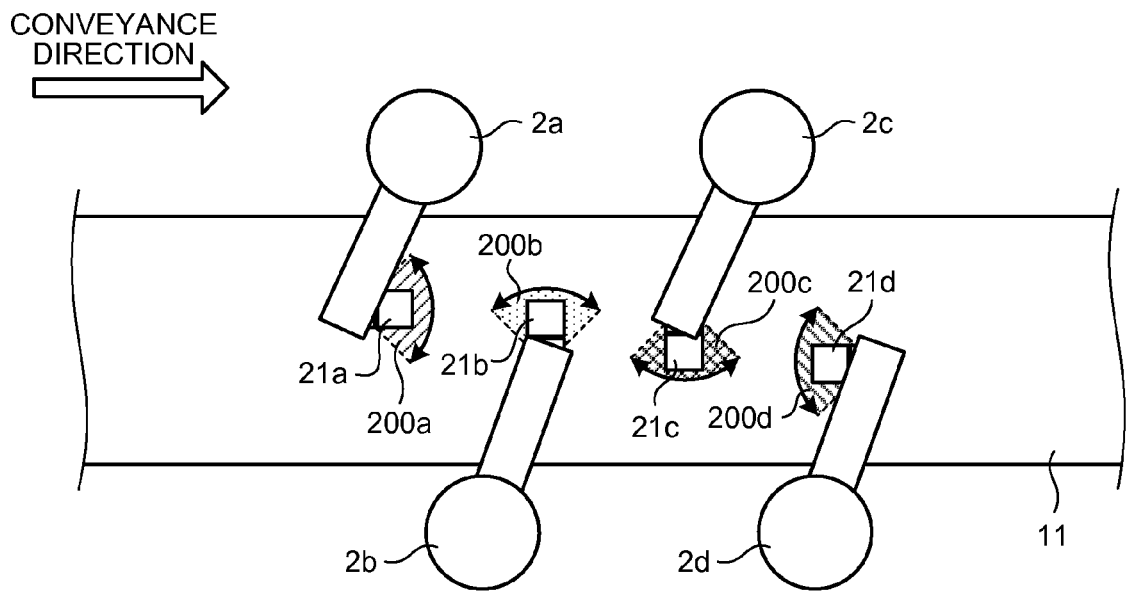
FIG. 15A is a diagram illustrating another example of the robot system.
Figure 15B:
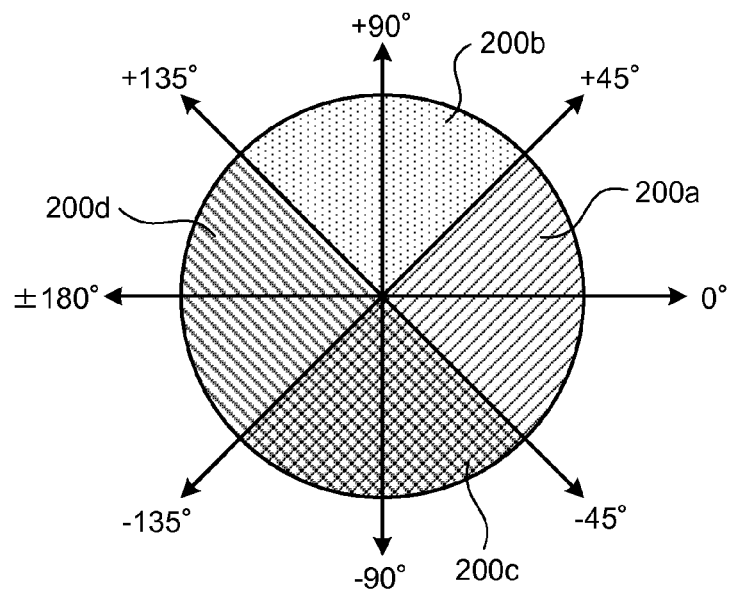
FIG. 15B is a diagram illustrating an example of an angular range associated with each robot.

Meanwhile, it has been explained in the third and fourth embodiments that the robot system includes the two robots 2a and 2b as an example. However, the robot system may include three or more robots. Hereinafter, as an example, the robot system that includes the four robots 2a to 2d is explained with reference to FIGS. 15A and 15B. FIG. 15A is a diagram illustrating another example of the robot system. FIG. 15B is a diagram illustrating an example of angular ranges associated with the robots 2a to 2d.

As illustrated in FIG. 15A, also when the robot system includes the four robots 2a to 2d, it is only sufficient that the robots 2a to 2d are associated with different angular ranges similarly to the third and fourth embodiments described above.

For example, as illustrated in FIG. 15B, the robot 2a is associated with the first angular range 200a of −45 degrees to +45 degrees and the robot 2b is associated with the second angular range 200b of +45 degrees to +135 degrees. Moreover, the robot 2c is associated with a third angular range 200c of −45 degrees to −135 degrees and the robot 2d is associated with a fourth angular range 200d of +135 degrees to +180 degrees and −135 degrees to −180 degrees.

Furthermore, as illustrated in FIG. 15A, the robots 2a to 2d have, as initial setting, postures in which angles formed by the directions of the arm leading end 21a to 21d and the reference direction (herein, the conveyance direction) are included in angular ranges associated with the robots 2a to 2d.

In this way, when the number of installed robots is increased, it is only sufficient that an angular range is divided in accordance with the number of installed robots.

Fifth Embodiment

Next, the fifth embodiment will be explained. Herein, the same components as those explained already have the same reference numbers and the overlapping explanations are omitted.

Figure 16:
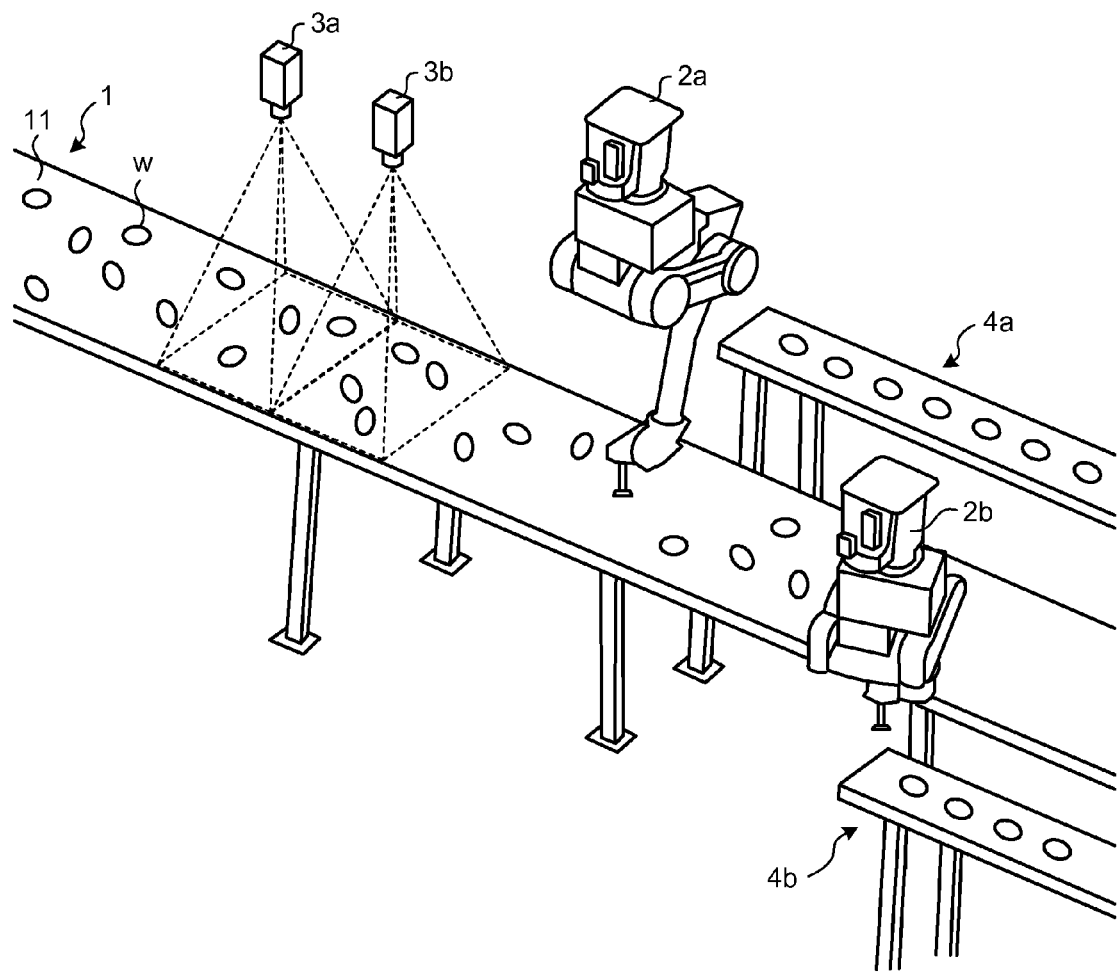
FIG. 16 is a pattern perspective view of a robot system according to a fifth embodiment.

First, an appearance of a robot system according to the fifth embodiment is explained with reference to FIG. 16. FIG. 16 is a pattern perspective view of the robot system according to the fifth embodiment. Hereinafter, similarly to the embodiments described above, the robot system that includes the two robots 2a and 2b will be explained as an example.

As illustrated in FIG. 16, the robot system according to the fifth embodiment includes the conveyer 1, the robots 2a and 2b, and cameras 3a and 3b.

The cameras 3a and 3b is image capturing devices that are placed at the upper stream side of the conveyer 1 than the robots 2a and 2b to capture respective different areas on the conveying path 11 of the conveyer 1. Images captured by the cameras 3a and 3b are output to a control device via a communication network such as a local area network (LAN). Moreover, because the conveyer 1 is moving, the cameras 3a and 3b capture different areas on the conveyer 1 every capturing time.

The robot system according to the fifth embodiment has the above configuration. The cameras 3a and 3b capture the respective different areas on the conveying path 11, and the control device detects the workpieces w on the conveying path 11 on the basis of the images captured by the cameras 3a and 3b and instructs the robots 2a and 2b to perform the holding operation on the detected workpieces w. Then, the robots 2a and 2b perform the holding operation and the moving operation in accordance with the instruction of the control device.

In the robot system according to the fifth embodiment, the robots 2a and 2b are associated with the paired cameras 3a and 3b. The control device instructs the robots 2a and 2b corresponding to the cameras 3a and 3b that capture the workpieces w to perform the holding operation on the workpieces w detected on the basis of the images captured by the cameras 3a and 3b. Hereinafter, the configuration and operation of the control device will be specifically explained.

Figure 17:
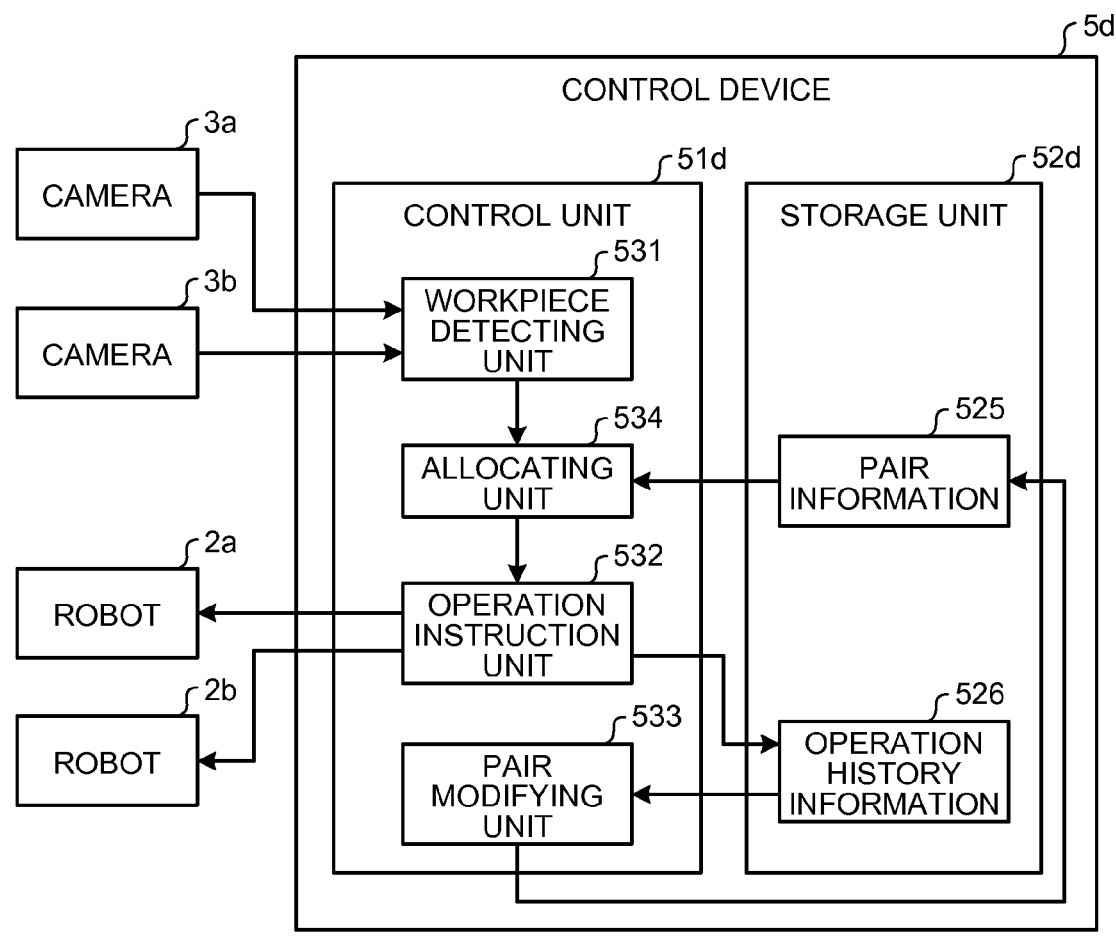
FIG. 17 is a block diagram illustrating the configuration of a control device according to the fifth embodiment.

FIG. 17 is a block diagram illustrating the configuration of a control device 5d according to the fifth embodiment. Only components needed to explain the characteristic of the control device is illustrated in FIG. 17 and the descriptions on general components are omitted.

As illustrated in FIG. 17, the control device 5d includes a control unit 51d and a storage unit 52d. The control unit 51d includes a workpiece detecting unit 531, an allocating unit 534, an operation instruction unit 532, and a pair modifying unit 533. The storage unit 52d stores therein pair information 525 and operation history information 526.

The control unit 51d totally controls the control device 5d. The workpiece detecting unit 531 is a processing unit that detects the workpieces w on the conveying path 11 on the basis of the images input from the cameras 3a and 3b and outputs the detection result to the allocating unit 534. In this way, the workpiece detecting unit 531 is an example of a workpiece detecting device.

Herein, the detection result of the workpieces w output from the workpiece detecting unit 531 to the allocating unit 534 includes information such as the positions and postures of the workpieces w and information (hereinafter, "capturing camera information") indicating the cameras 3a and 3b that capture the workpieces w.

Moreover, the detection of the workpieces w performed by the workpiece detecting unit 531 may be performed by using any well-known technology.

The allocating unit 534 is a processing unit that performs a process for determining which of the robots 2a and 2b performs the holding operation and the moving operation on the workpieces w by using the detection result of the workpieces w received from the workpiece detecting unit 531 and the pair information 525 stored in the storage unit 52d.

The pair information 525 is information that associates the robots 2a and 2b with the paired cameras 3a and 3b. In the fifth embodiment, it is assumed that the camera 3a is associated with the robot 2a and the camera 3b is associated with the robot 2b.

Upon receiving the detection result of the workpieces w from the workpiece detecting unit 531, the allocating unit 534 refers to the capturing camera information included in the detection result and specifies the cameras 3a and 3b that capture the workpieces w. Moreover, the allocating unit 534 refers to the pair information 525 and specifies the robots 2a and 2b associated with the specified cameras 3a and 3b.

Then, the allocating unit 534 determines the specified robots 2a and 2b as a robot for performing the holding operation and the moving operation on the workpieces w. Moreover, upon determining which of the robots 2a and 2b performs the holding operation and the moving operation on the workpieces w, the allocating unit 534 outputs, to the operation instruction unit 532, the detection result of the workpieces w and information that associates the robots 2a and 2b for performing the holding operation with the workpieces w detected by the workpiece detecting unit 531.

The operation instruction unit 532 is a processing unit that generates an operation instruction for performing the holding operation on the workpieces w on the basis of the detection result of the workpiece detecting unit 531 and transmits the operation instruction to the robots 2a and 2b corresponding to the information received from the allocating unit 534.

As a result, the robot 2a corresponding to the camera 3a performs the holding operation on the workpieces w captured by the camera 3a and the robot 2b corresponding to the camera 3b performs the holding operation on the workpieces w captured by the camera 3b. Moreover, operation examples of the workpiece detecting unit 531 and the allocating unit 534 are described below with reference to FIGS. 18A to 19B.

Whenever the operation instruction unit 532 instructs the robots 2a and 2b to perform the holding operation on the workpieces w, the operation instruction unit 532 also performs a process for updating the operation history information 526. Herein, the operation history information 526 is information for storing the number of the workpieces w processed by each of the robots 2a and 2b, that is to say, the number of the workpieces w on which each of the robots 2a and 2b performs the holding operation.

The operation instruction unit 532 may update the operation history information 526 whenever the operation instruction unit 532 does not instruct each of the robots 2a and 2b to perform the holding operation on the workpieces w but receives the effect that the holding operation and the moving operation are completed from each of the robots 2a and 2b.

Figure 18A:
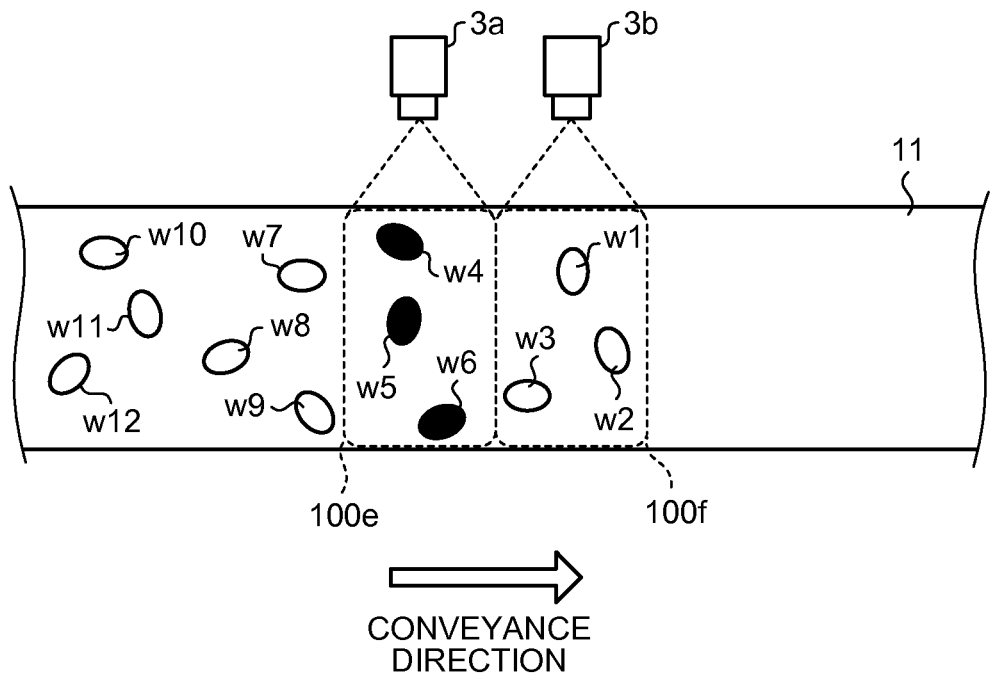
FIGS. 18A and 18B are diagrams illustrating an example of a detection process.
Figure 18B:
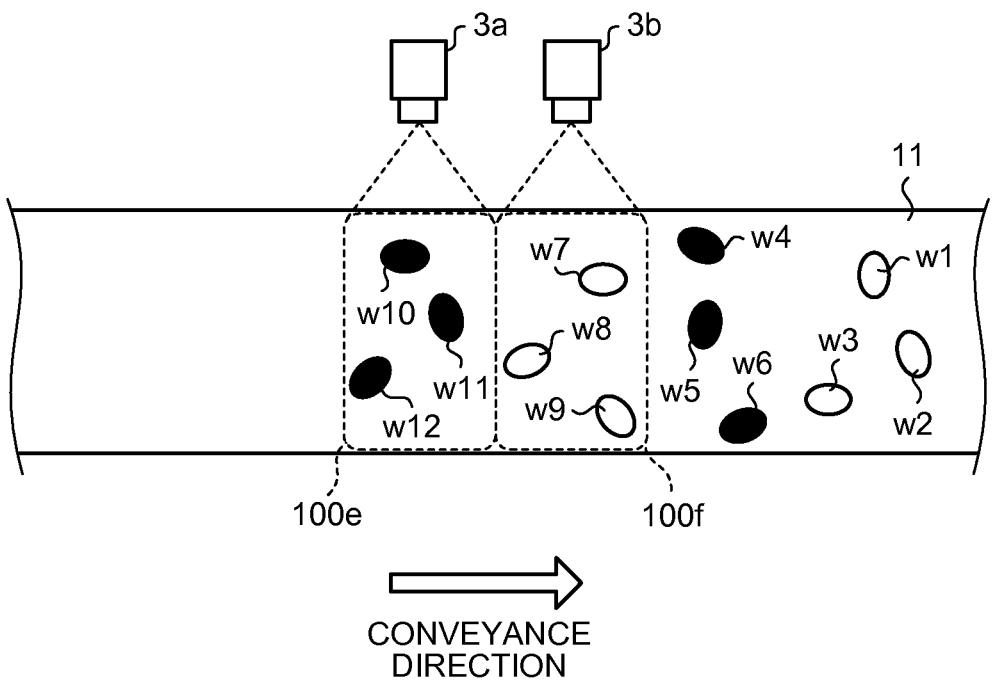
Figure 19A:
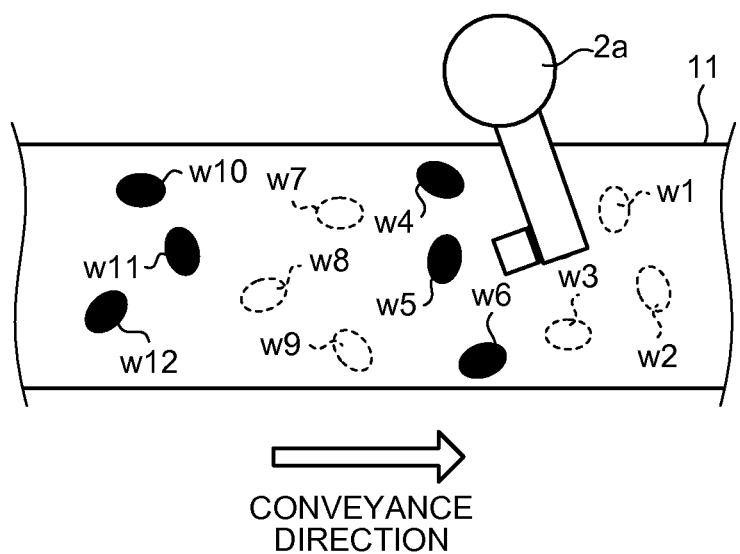
FIGS. 19A and 19B are diagrams illustrating an operation example of a robot.
Figure 19B:
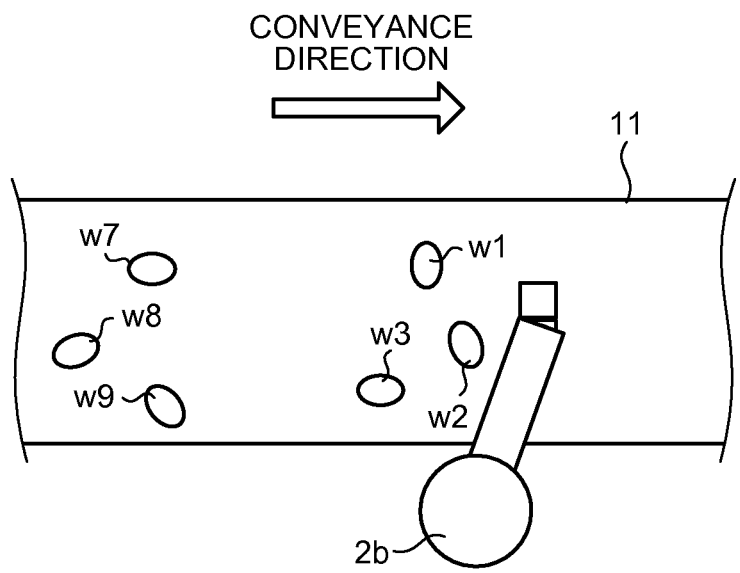

Herein, operation examples of the workpiece detecting unit 531 and the allocating unit 534 are explained with reference to FIGS. 18A to 19B. FIGS. 18A and 18B are diagrams illustrating an example of a detection process that is performed by the workpiece detecting unit 531. FIGS. 19A and 19B are diagrams illustrating an operation example of the robots 2a and 2b.

As illustrated in FIG. 18A, it is assumed that, among workpieces w1 to w12 conveyed by the conveyer 1, the workpieces w1 to w3 are captured by the camera 3b and the workpieces w4 to w6 are captured by the camera 3a. The workpiece detecting unit 531 detects the workpieces w1 to w3 on the basis of the image captured by the camera 3b and detects the workpieces w4 to w6 on the basis of the image captured by the camera 3a.

The workpiece detecting unit 531 outputs, to the allocating unit 534, information such as the positions and postures of the workpieces w1 to w3 and capturing camera information indicating that a camera that captures the workpieces w1 to w3 is the camera 3b, as the detection result of the workpiece w1 to w3. Moreover, the workpiece detecting unit 531 outputs, to the allocating unit 534, information such as the positions and postures of the workpieces w4 to w6 and capturing camera information indicating that a camera that captures the workpieces w4 to w6 is the camera 3a, as the detection result of the workpieces w4 to w6.

Similarly, as illustrated in FIG. 18B, it is assumed that the workpieces w7 to w9 are captured by the camera 3b and the workpieces w10 to w12 are captured by the camera 3a at the next capturing time. In this case, the workpiece detecting unit 531 outputs, to the allocating unit 534, information such as the positions and postures of the workpieces w7 to w9 and capturing camera information indicating that a camera that captures the workpieces w7 to w9 is the camera 3b, as the detection result of the workpieces w7 to w9. Moreover, the workpiece detecting unit 531 outputs, to the allocating unit 534, information such as the positions and postures of the workpieces w10 to w12 and capturing camera information indicating that a camera that captures the workpieces w10 to w12 is the camera 3a, as the detection result of the workpieces w10 to w12.

Herein, as illustrated in FIGS. 18A and 18B, an area 100e on the conveying path 11 captured by the camera 3a and an area 100f on the conveying path 11 captured by the camera 3b are adjacent to each other along the conveyance direction. In other words, the cameras 3a and 3b respectively capture the adjacent areas on the conveying path 11 that are located along the conveyance direction of the conveyer 1. For this reason, the workpieces w can be appropriately captured without failing to capture them conveyed from the upper stream side toward the lower stream side of the conveyer 1.

Hereinafter, as illustrated in FIGS. 18A and 18B, the workpieces w4 to w6 and w10 to w12 captured by the camera 3a are indicated by a black color to distinguish them from the workpieces w1 to w3 and w7 to w9 captured by the camera 3b.

The allocating unit 534 determines the robot 2a corresponding to the camera 3a as a robot that performs the holding operation and the moving operation on the workpieces w4 to w6 and w10 to w12 captured by the camera 3a, on the basis of the pair information 525 and the detection result received from the workpiece detecting unit 531. As a result, as illustrated in FIG. 19A, the robot 2a performs the holding operation and the moving operation on the workpieces w4 to w6 and w10 to w12 captured by the camera 3a among the workpieces w1 to w12.

The allocating unit 534 determines the robot 2b as a robot that performs the holding operation and the moving operation on the workpieces w1 to w3 and w7 to w9 captured by the camera 3b. As a result, as illustrated in FIG. 19B, the robot 2b performs the holding operation and the moving operation on the workpieces w1 to w3 and w7 to w9 captured by the camera 3b among the workpieces w1 to w12.

In this way, it has been explained that the control device 5d instructs the robots 2a and 2b corresponding to the cameras 3a and 3b that capture the workpieces w to perform the holding operation on the workpieces w. As a result, the robot system according to the fifth embodiment can achieve improvement of work efficiency.

In other words, when a robot system requires to process a large quantity of workpieces in a short time, the robot system adjacently provides multiple robots and makes the downstream-side robot process workpieces that are not processed by the upstream-side robot to achieve improvement of processing performance. However, in such a method, the load concentrates on a robot placed at the upstream side and thus the robot system may not be efficient as a whole.

On the contrary, in the robot system according to the fifth embodiment, the robots 2a and 2b respectively corresponding to the cameras 3a and 3b perform the holding operation on the workpieces w captured by the cameras 3a and 3b in a shared manner. For this reason, total work efficiency of the robot system can be raised because the processing loads of the robots 2a and 2b are balanced.

Moreover, when a conveyance speed is speeded up, the capturing of workpieces is not completely performed depending on the performance of a camera and thus it may fail to capture the workpieces. The workpiece that is not captured is not held by the robot and is consequently conveyed to the lower stream side. In other words, because the unpicking of the workpiece occurs, it is not preferable.

However, the robot system according to the fifth embodiment can easily realize the speed-up of the conveyance speed by increasing the number of pairs of a camera and a robot in accordance with the conveyance speed when it wants to further speed up the conveyance speed of the conveyer 1.

Returning to FIG. 17, the pair modifying unit 533 will be explained. The pair modifying unit 533 is a processing unit that changes a correspondence relationship between the cameras 3a and 3b and the robots 2a and 2b in accordance with the workloads of the robots 2a and 2b.

More specifically, the pair modifying unit 533 refers to the operation history information 526, and updates the pair information 525 to change a pair relation between the cameras 3a and 3b and the robots 2a and 2b when a ratio between the number of the workpieces w processed by the robot 2a and the number of the workpieces w processed by the robot 2b exceeds a predetermined range. The specific contents of a pair modification process performed by the pair modifying unit 533 are described below with reference to FIGS. 20A and 20B.

The storage unit 52d is constituted by a storage device such as for example a nonvolatile memory and a hard disk drive. The storage unit 52d stores the pair information 525 and the operation history information 526. The pair information 525 is information that associates the robots 2a and 2b with the paired cameras 3a and 3b. Moreover, the operation history information 526 is information storing the number of the workpieces w processed by each of the robots 2a and 2b, that is to say, the number of the workpieces w on which each of the robots 2a and 2b performs the holding operation.

Figures 20A, 20B:
FIG. 20A is a diagram illustrating an example of operation history information.
FIG. 20B is a diagram illustrating an example of pair information.

Herein, an operation example of the pair modification process performed by the pair modifying unit 533 is explained with reference to FIGS. 20A and 20B. FIG. 20A is a diagram illustrating an example of the operation history information 526. FIG. 20B is a diagram illustrating an example of the pair information 525.

As illustrated in FIG. 20A, the operation history information 526 assumes that "100" is associated with "the robot 2a" and "50" is associated with "the robot 2b". The pair modifying unit 533 refers to the operation history information 526 to calculate a ratio "0.5" of the number "50" of the workpieces w processed by the robot 2b to the number "100" of the workpieces w processed by the robot 2a.

Herein, assuming that a predetermined range is "0.3 to +0.3", because the ratio "0.5" exceeds the predetermined range, that is to say, a processing load concentrates on one (herein, the robot 2a) of the robots, the pair modifying unit 533 changes the pair between the cameras 3a and 3b and the robots 2a and 2b. More specifically, as illustrated in FIG. 20B, the pair modifying unit 533 updates the pair information 525 that associates the camera 3a with the robot 2a and the camera 3b with the robot 2b to associate the camera 3b with the robot 2a and the camera 3a with the robot 2b.

In this way, assuming that the correspondence relationship between the cameras 3a and 3b and the robots 2a and 2b is changed in accordance with the workloads of the robots 2a and 2b, a processing load can be prevented from continuing to concentrate on one of the robots 2a and 2b.

Herein, it has been explained that the operation history information 526 is used as the workloads of the robots 2a and 2b. However, the embodiment is not limited to this. For example, the pair modifying unit 533 may accumulate the detection results of the workpieces w performed by the workpiece detecting unit 531 in the storage unit 52d, calculate the number of the workpieces w captured by the camera 3a and the number of the workpieces w captured by the camera 3b from the accumulated detection results, and use these numbers as the workloads of the robots 2a and 2b respectively corresponding to the cameras 3a and 3b.

As described above, it has been explained in the fifth embodiment that the control device instructs the robots that are associated with the areas captured by the cameras to perform the holding operation on the workpieces. More specifically, it has been explained in the fifth embodiment that the control device instructs the robot corresponding to the camera that captures the workpiece to perform the holding operation on the workpiece. Therefore, improvement of work efficiency can be achieved.

Meanwhile, it has been explained in the fifth embodiment that the robot system includes the two robots 2a and 2b as an example. However, the robot system may include three or more robots. Hereinafter, a robot system that includes the four robots 2a to 2d as an example is explained with reference to FIG. 21. FIG. 21 is a diagram illustrating another example of the robot system.

As illustrated in FIG. 21, when the robot system includes the four robots 2a to 2d, it is only sufficient that cameras 3a to 3d respectively corresponding to the robots 2a to 2d are arranged side-by-side along the conveyance direction. In this way, the speed-up of a conveyance speed can be easily realized by increasing the number of pairs between cameras and robots.

The cameras 3a to 3d respectively capture areas 100e to 100h on the conveying path 11 that are adjacent to each other along the conveyance direction. As a result, the workpieces w can be appropriately captured without failing to capture the workpieces w conveyed from the upper stream side toward the lower stream side.

The pair modifying unit 533 may regularly calculate the workloads of the robots 2a to 2d on the basis of the operation history information 526 and interchange a pair of a robot having the most workload and a camera corresponding to the robot and a pair of a robot having a least workload and a camera corresponding to the robot.

Meanwhile, it has been explained in the fifth embodiment that the robot system includes multiple cameras as an example. In other words, it has been explained in the fifth embodiment that cameras are associated with robots on a one-to-one basis. However, an association method between cameras and robots is not limited to this. For example, only one camera may be provided and multiple robots may be alternately associated with the camera. Hereinafter, this case is explained with reference to FIGS. 22A to 22C.

Figure 22A:
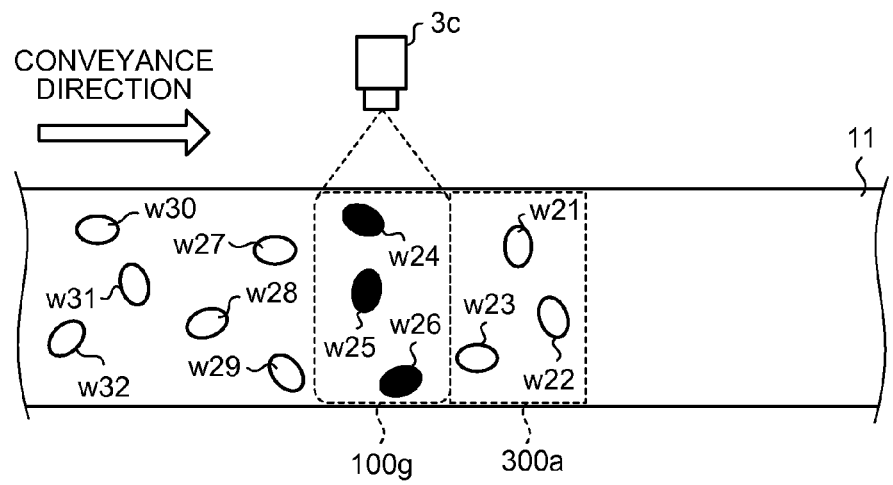
FIGS. 22A to 22C are explanation diagrams of another association method between a camera and a robot.
Figure 22B:
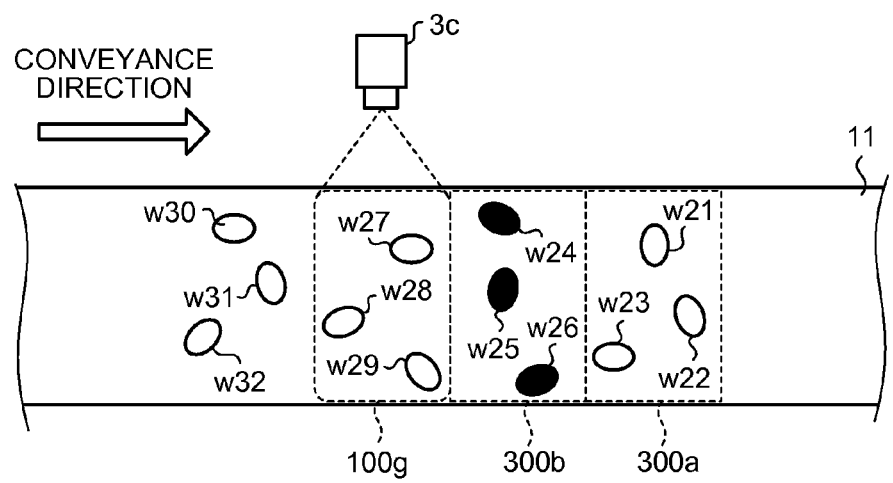
Figure 22C:
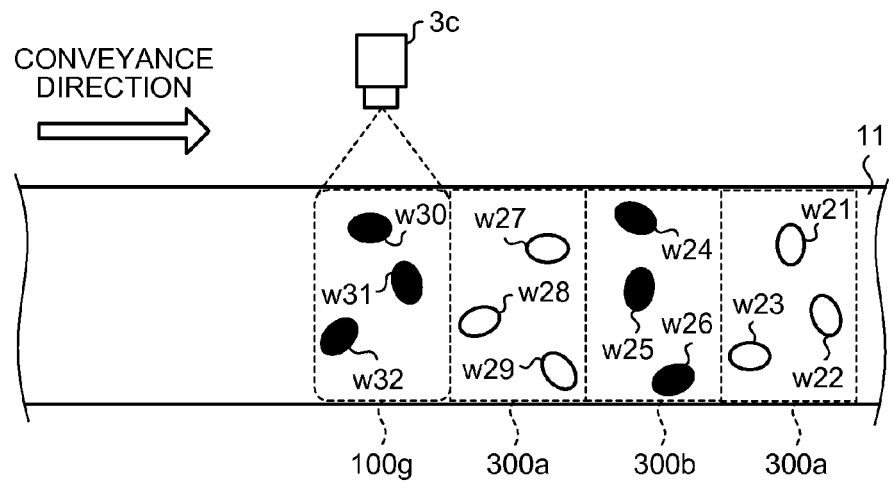

FIGS. 22A to 22C are explanation diagrams illustrating another association method between cameras and robots. Herein, a robot system that includes the one camera 3c and the two robots 2a and 2b (not illustrated) will be explained as an example.

A situation on the conveying path 11 at a capturing time of the camera 3c is illustrated in FIG. 22A, a situation on the conveying path 11 at a capturing time next to the capturing time illustrated in FIG. 22A is illustrated in FIG. 22B, and a situation on the conveying path 11 of a capturing time next to the capturing time illustrated in FIG. 22B is illustrated in FIG. 22C.

The camera 3c is associated with one of the robots 2a and 2b every capturing time. For example, among capturing times of the camera 3c, it is assumed that odd capturing times are the first capturing time and even capturing times are the second capturing time. Then, the camera 3c is associated with the robot 2a at the first capturing time and is associated with the robot 2b at the second capturing time. The association information is previously stored in the storage unit 52d, for example.

Herein, as illustrated in FIG. 22A, it is assumed that the camera 3c captures workpieces w24 to w26 at the first capturing time. In this case, the allocating unit 534 determines the robot 2a associated with the camera 3c at the first capturing time as a robot that performs the holding operation and the moving operation on the workpieces w24 to w26.

The workpieces w21 to w23 included in an area 300a in FIG. 22A are workpieces captured at the second capturing time just prior to the first capturing time at which the workpieces w24 to w26 are captured. Therefore, the allocating unit 534 determines the robot 2b associated with the camera 3c at the second capturing time as a robot that performs the holding operation and the moving operation on the workpieces w21 to w23.

Similarly, the allocating unit 534 determines the robot 2b as a robot that performs the holding operation and the moving operation on workpieces w27 to w29 captured by the camera 3c at the second capturing time next to the first capturing time illustrated in FIG. 22A (see FIG. 22B). Moreover, the allocating unit 534 determines the robot 2a as a robot that performs the holding operation and the moving operation on workpieces w30 to w32 captured by the camera 3c at the first capturing time next to the second capturing time illustrated in FIG. 22B (see FIG. 22C).

In this way, the control device 5d alternately instructs the robots 2a and 2b to perform the holding operation and the moving operation on the workpieces w captured at the first capturing time, that is to say, the workpieces w24 to w26 and w30 to w32 included in an area 300b and the workpieces w captured at the second capturing time, that is to say, the workpieces w21 to w23 and w27 to w29 included in the area 300a.

In other words, the control device 5d has different capturing areas with respect to capturing times of one camera. More specifically, because the control device 5d instructs the robots 2a and 2b associated with the camera 3c to perform the holding operation on the workpieces w at the capturing time of the workpieces w, improvement of work efficiency can be achieved similarly to the fifth embodiment described above.

In this case, it is preferable that an interval between capturing times is determined on the basis of the conveyance-direction width of an area 100g on the conveying path 11 captured by the camera 3c and the conveyance speed of the conveyer 1.

For example, assuming that the conveyance-direction width of the area 100g on the conveying path 11 captured by the camera 3c is "D(m)" and the conveyance speed of the conveyer 1 is "V(m/s)", the interval "T(s)" between capturing times can be calculated by using an equation "T=D/V". By determining the interval between capturing times in this way, the workpieces can be appropriately captured without failing to capture the workpieces w conveyed from the upper stream side toward the lower stream side.

It has been explained in the embodiments described above that the adsorption units 22a and 22b that are an example of a holding device hold the workpieces conveyed by the conveyer 1 that is an example of a conveying device and place the held workpieces on the conveying path 11 as an example of a working operation. However, the working operation may be an operation for making a cut in the workpieces conveyed by the conveying device by using a cutter attached to the robot, for example. Alternatively, the working operation may be an operation for forming a branding iron on the workpieces conveyed by the conveying device by using a heater attached to the robot.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

Furthermore, the following aspects of the embodiments are disclosed.

(1) A picking system includes:
a conveying device that conveys workpieces;
a plurality of robots that performs a holding operation for holding the workpieces conveyed by the conveying device and a moving operation for moving the held workpieces to a predetermined place;

an image capturing device that is placed at an upper stream side of the conveying device than the plurality of robots to capture a conveying path of the conveying device; and a control device that detects the workpieces on the conveying path on the basis of an image captured by the image capturing device and instructs the robot to perform the holding operation on the detected workpieces, and the control device determines, on the basis of a conveying situation of each of the workpieces, which of the plurality of robots performs the holding operation on the workpiece.

(2) In the picking system according to (1), the control device instructs, for each of divided areas obtained by dividing an image area of the image, the robot corresponding to the divided area to perform the holding operation on the workpieces belonging to the divided area.

(3) In the picking system according to (2), the divided areas are areas that are by dividing the image area of the image in parallel with a conveyance direction of the workpieces.

(4) In the picking system according to (2) or (3), the control device calculates an inclination of the workpieces on the conveying path and changes sizes of the divided areas in accordance with the calculated inclination.

(5) In the picking system according to (4), the control device calculates an inclination of the workpieces on the conveying path on the basis of operation histories of the robots.

(6) In the picking system according to (4), the control device calculates, whenever the image is captured by the image capturing device, a workpiece area ratio between the divided areas of the image as the inclination of the workpieces on the conveying path.

(7) In the picking system according to (1), the control device further detects directions of the workpieces on the basis of the image and instructs the robot corresponding to the detected direction of the workpiece to perform the holding operation on the workpiece.

(8) In the picking system according to (7), the control device associates the robots with predetermined angular ranges and instructs the robot associated with the angular range that includes an angle formed by the detected direction of the workpiece and a predetermined reference direction to perform the holding operation on the workpiece.

(9) In the picking system according to (8), each of the robots further includes a holding part that holds the workpieces, and the control device associates the predetermined angular range, which includes an angle formed by a direction of the holding part and the predetermined reference direction when the robot takes an initial posture, with the robot.

(10) The picking system according to (8) or (9), the control device changes sizes of the predetermined angular ranges in accordance with workloads of the plurality of robots.

(11) In the picking system according to any one of (8) to (10), the control device changes initial postures of the robots on the basis of statistics of the detected directions of the workpieces.

(12) In the picking system according to (1), the image capturing device captures different areas on the conveying path of the conveying device, and the control device instructs the robot associated with each of the areas captured by the image capturing device to perform the holding operation on the corresponding workpieces.

(13) In the picking system according to (12), the image capturing device includes a plurality of image capturing devices that captures the respective different areas on the conveying path, and the control device instructs the robot associated with the image capturing device that captures the corresponding workpieces to perform the holding operation on the workpieces.

(14) In the picking system according to (13), the plurality of image capturing devices captures the respective areas on the conveying path that are adjacent to each other along a conveyance direction of the conveying device.

(15) In the picking system according to (13) or (14), the control device changes a correspondence relationship between the image capturing devices and the robots in accordance with workloads of the plurality of robots.

(16) In the picking system according to (12), the image capturing device captures the different areas at capturing times of the one image capturing device.

(17) In the picking system according to (16), an interval between the capturing times is determined on the basis of a conveyance-direction width of the area on the conveying path captured by the image capturing device and a conveyance speed of the conveying device.

What is claimed is:

1. A robot system comprising:
    a conveying device that conveys workpieces;
    a plurality of robots that performs a working operation on the workpieces conveyed by the conveying device;
    an image capturing device that is placed at an upper stream side of the conveying device than the plurality of robots to capture a conveying path of the conveying device;
    a workpiece detecting device that detects the workpieces on the conveying path on the basis of an image captured by the image capturing device; and
    a control device that controls operations of the plurality of robots, and
    the control device including:
        an operation instruction unit that generates an operation instruction for performing a holding operation on the workpieces on the basis of a detection result of the workpiece detecting device and transmits the operation instruction to the robots; and
        an allocating unit that determines which of the plurality of robots to which the operation instruction unit transmits the operation instruction on the basis of conveying situations of the workpieces obtained from the detection result of the workpiece detecting device,
    wherein the control device instructs, for each of divided areas obtained by dividing an image area of the image, the robot corresponding to the divided area to perform the holding operation on the workpieces belonging to the divided area, and
    wherein the control device calculates a degree of bias by which a number of the workpieces are biased to one side on the conveying path and changes sizes of the divided areas in accordance with the calculated degree of bias.

2. The robot system according to claim 1, wherein each of the robots includes a holding device that holds the workpieces.

3. The robot system according to claim 1, wherein the divided areas are areas that are obtained dividing the image area of the image in parallel with a conveyance direction of the workpieces.

4. The robot system according to claim 1, wherein the control device calculates the degree of bias of the workpieces on the conveying path on the basis of operation histories of the robots.

5. The robot system according to claim 1, wherein the control device calculates a workpiece area ratio between the divided areas of the image as the degree of bias of the workpieces on the conveying path whenever the image is captured by the image capturing device.

6. A robot system comprising:
a conveying device that conveys workpieces;
a plurality of robots that performs a working operation on the workpieces conveyed by the conveying device;
an image capturing device that is placed at an upper stream side of the conveying device than the plurality of robots to capture a conveying path of the conveying device;
a workpiece detecting device that detects the workpieces on the conveying path on the basis of an image captured by the image capturing device; and
a control device that controls operations of the plurality of robots, and
the control device including:
an operation instruction unit that generates an operation instruction for performing a holding operation on the workpieces on the basis of a detection result of the workpiece detecting device and transmits the operation instruction to the robots; and
an allocating unit that determines which of the plurality of robots to which the operation instruction unit transmits the operation instruction on the basis of conveying situations of the workpieces obtained from the detection result of the workpiece detecting device,
wherein the workpiece detecting device further detects directions of the workpieces on the basis of the image, and
wherein the control device associates the robots with the respective directions and instructs one of the robots to perform the holding operation on the workpiece having the direction corresponding to the one robot.

7. The robot system according to claim 6, wherein the control device associate the robots with predetermined angular ranges that include angles formed by the detected directions of the workpieces and a predetermined reference direction, and instructs one of the robots to perform the holding operation on the workpiece in the angular range corresponding to the one robot.

8. The robot system according to claim 7, wherein
each of the robots includes a holding device that holding the workpieces, and
the control device associates the robots with the predetermined angular ranges, which include angles formed by directions of the holding devices and the predetermined reference direction when the robots take initial postures.

9. The robot system according to claim 7, wherein the control device changes sizes of the predetermined angular ranges in accordance with workloads of the plurality of robots.

10. A robot system comprising:
a conveying device that conveys workpieces;
a plurality of robots that performs a working operation on the workpieces conveyed by the conveying device;
an image capturing device that is placed at an upper stream side of the conveying device than the plurality of robots to capture a conveying path of the conveying device;
a workpiece detecting device that detects the workpieces on the conveying path on the basis of an image captured by the image capturing device; and
a control device that controls operations of the plurality of robots, and
the control device including:
an operation instruction unit that generates an operation instruction for performing a holding operation on the workpieces on the basis of a detection result of the workpiece detecting device and transmits the operation instruction to the robots; and
an allocating unit that determines which of the plurality of robots to which the operation instruction unit transmits the operation instruction on the basis of conveying situations of the workpieces obtained from the detection result of the workpiece detecting device,
wherein the image capturing device captures different areas on the conveying path of the conveying device, and
wherein the control device associates the robots with the respective areas and instructs one of the robots to perform the holding operation on the workpiece in the area corresponding to the one robot.

11. The robot system according to claim 10, wherein
the robot system further comprises one or more image capturing devices that captures the respective different areas on the conveying path, and
the control device associates the robots with the respective image capturing devices and instructs one of the robots to perform the holding operation on the workpiece in the area captured by the image capturing device corresponding to the one robot.

12. The robot system according to claim 11, wherein the plurality of image capturing devices captures the respective areas on the conveying path that are adjacent to each other along a conveyance direction of the conveying device.

13. The robot system according to claim 12, wherein the control device changes a correspondence relationship between the image capturing devices and the robots in accordance with workloads of the plurality of robots.

14. The robot system according to claim 10, wherein the image capturing device captures the different areas at capturing times of the one image capturing device.

15. The robot system according to claim 14, wherein an interval between the capturing times is determined on the basis of a conveyance-direction width of the area on the conveying path captured by the image capturing device and a conveyance speed of the conveying device.

16. A robot system comprising:
a conveying means that conveys workpieces;
a plurality of robots that performs a holding operation for holding the workpieces conveyed by the conveying means and a moving operation for moving the held workpieces to a predetermined place;
a capturing means that captures the workpieces conveyed by the conveying means; and
a control means that detects the workpieces on the basis of an image captured by the capturing means and instructs the robots to perform the holding operation on the detected workpieces, wherein
the control means determines which of the robots performs the holding operation on the workpieces on the basis of conveying situations of the workpieces,
the control means instructs, for each of divided areas obtained by dividing an image area of the image, the robot corresponding to the divided area to perform the holding operation on the workpieces belonging to the divided area, and
the control means calculates a degree of bias by which a number of the workpieces are biased to one side on the conveying means and changes sizes of the divided areas in accordance with the calculated degree of bias.

17. The robot system according to claim 1, wherein the divided areas are areas that are obtained by diagonally dividing the image area of the image with respect to a conveyance direction of the workpieces.

* * * * *